(12) United States Patent
Major, Jr. et al.

(10) Patent No.: US 9,606,234 B2
(45) Date of Patent: Mar. 28, 2017

(54) AMPLIFIED OPTICAL CIRCUIT

(71) Applicant: Tramontane Technologies, Inc., Cupertino, CA (US)

(72) Inventors: Jo Stephen Major, Jr., Cupertino, CA (US); Hans Jurgen Hofler, Sunnyvale, CA (US); Bradley D. Gaiser, Los Altos, CA (US)

(73) Assignee: Tramontane Technologies, Inc., Cupertino, CA (US)

( * ) Notice: Subject to any disclaimer, the term of this patent is extended or adjusted under 35 U.S.C. 154(b) by 0 days.

(21) Appl. No.: 14/519,042

(22) Filed: Oct. 20, 2014

(65) Prior Publication Data

US 2015/0109605 A1    Apr. 23, 2015

Related U.S. Application Data

(60) Provisional application No. 61/893,004, filed on Oct. 18, 2013, provisional application No. 61/974,389, filed on Apr. 2, 2014.

(51) Int. Cl.
| | |
|---|---|
| *G01P 3/36* | (2006.01) |
| *G01S 17/58* | (2006.01) |
| *G01S 7/481* | (2006.01) |
| *G01S 7/499* | (2006.01) |

(Continued)

(52) U.S. Cl.
CPC ............ *G01S 17/58* (2013.01); *G01S 7/4811* (2013.01); *G01S 7/4818* (2013.01); *G01S 7/4868* (2013.01); *G01S 7/499* (2013.01); *G01S 17/95* (2013.01)

(58) Field of Classification Search
CPC ........... G01S 17/50; G01S 17/58; G01P 3/366
See application file for complete search history.

(56) References Cited

U.S. PATENT DOCUMENTS

| | | | |
|---|---|---|---|
| 4,875,770 A | 10/1989 | Rogers et al. | |
| 5,013,928 A | 5/1991 | Ikeda et al. | |
| 5,272,513 A | 12/1993 | Vahala et al. | |

(Continued)

FOREIGN PATENT DOCUMENTS

| | | |
|---|---|---|
| CA | 2064488 | 4/1996 |
| CN | 101710178 | 5/2010 |

(Continued)

OTHER PUBLICATIONS

Barnes, W.L. et al., High-quantum-efficiency $Er^{3+}$ fiber lasers pumped at 980 nm, Optics Letters, vol. 14, No. 18, pp. 1002-1004, Sep. 15, 1989.

(Continued)

*Primary Examiner* — Luke Ratcliffe
*Assistant Examiner* — Samantha K Abraham
(74) *Attorney, Agent, or Firm* — Knobbe, Martens, Olson & Bear, LLP

(57) ABSTRACT

An optical circuit can include a bidirectional amplifier connected so as to amplify source light prior to emission through an output device such as a telescope as well as amplification of reflected light received by the telescope. Such an optical circuit can be used in laser doppler velocimeter applications as well as other applications. The optical circuit can also include passive splitters or active switches to provide for advantageous multiplexing.

30 Claims, 18 Drawing Sheets

(51) Int. Cl.
*G01S 17/95* (2006.01)
*G01S 7/486* (2006.01)

(56) References Cited

U.S. PATENT DOCUMENTS

| | | | |
|---|---|---|---|
| 5,526,155 A | 6/1996 | Knox et al. | |
| 5,548,438 A | 8/1996 | Delavaux | |
| 5,563,733 A * | 10/1996 | Mitsuda et al. | 359/337.1 |
| 5,572,612 A | 11/1996 | Delavaux et al. | |
| 5,652,675 A | 7/1997 | Shibuya | |
| 5,677,786 A * | 10/1997 | Meli | 359/341.1 |
| 5,726,796 A | 3/1998 | Regener et al. | |
| 5,812,306 A | 9/1998 | Mizrahi | |
| 5,815,250 A | 9/1998 | Thomson et al. | |
| 5,815,308 A | 9/1998 | Kim et al. | |
| 5,835,199 A | 11/1998 | Phillips et al. | |
| 5,847,817 A | 12/1998 | Zediker et al. | |
| 5,854,994 A | 12/1998 | Canada et al. | |
| 5,875,054 A | 2/1999 | Onoda et al. | |
| 6,081,368 A | 6/2000 | Delavaux | |
| 6,104,930 A * | 8/2000 | Ward et al. | 455/450 |
| 6,130,775 A | 10/2000 | Yang | |
| 6,141,086 A | 10/2000 | Vahala et al. | |
| 6,175,444 B1 | 1/2001 | Toyohara | |
| 6,212,000 B1 | 4/2001 | Ishikawa | |
| 6,377,393 B1 | 4/2002 | Saeki | |
| 6,392,790 B1 | 5/2002 | Lauder et al. | |
| 6,414,769 B1 * | 7/2002 | Meli et al. | 398/79 |
| 6,486,798 B2 | 11/2002 | Rast | |
| 6,490,386 B1 | 12/2002 | Cao et al. | |
| 6,519,519 B1 | 2/2003 | Stopczynski | |
| 6,532,106 B2 | 3/2003 | Chung et al. | |
| 6,580,497 B1 * | 6/2003 | Asaka et al. | 356/28.5 |
| 6,616,351 B1 * | 9/2003 | Jang | 398/94 |
| 6,646,725 B1 | 11/2003 | Eichinger et al. | |
| 6,665,063 B2 | 12/2003 | Jamieson et al. | |
| 6,728,027 B2 | 4/2004 | Rapp | |
| 6,894,768 B2 | 5/2005 | Caldwell et al. | |
| 6,894,830 B2 | 5/2005 | Lee et al. | |
| 6,952,308 B2 | 10/2005 | Lee et al. | |
| 7,030,971 B1 | 4/2006 | Payton | |
| 7,042,631 B2 | 5/2006 | Smith et al. | |
| 7,059,822 B2 | 6/2006 | LeMieux et al. | |
| 7,117,742 B2 | 10/2006 | Kim | |
| 7,199,920 B2 | 4/2007 | Kaspit et al. | |
| 7,206,064 B2 | 4/2007 | Rogers et al. | |
| 7,281,891 B2 | 10/2007 | Smith et al. | |
| 7,342,323 B2 | 3/2008 | Avagliano et al. | |
| 7,391,506 B2 | 6/2008 | Harris et al. | |
| 7,408,702 B2 | 8/2008 | Krylov et al. | |
| 7,502,395 B2 | 3/2009 | Cheng et al. | |
| 7,532,311 B2 | 5/2009 | Henderson et al. | |
| 7,561,200 B2 | 7/2009 | Garvey et al. | |
| 7,580,127 B1 | 8/2009 | Mayor et al. | |
| 7,677,869 B2 | 3/2010 | Martinez De Lizarduy Romo et al. | |
| 7,746,450 B2 | 6/2010 | Willner et al. | |
| 7,793,841 B2 | 9/2010 | Knowles et al. | |
| 7,822,560 B2 | 10/2010 | LeMieux | |
| 7,887,292 B2 | 2/2011 | Kuhlmeier | |
| 7,914,250 B2 | 3/2011 | Behera et al. | |
| 7,933,002 B2 | 4/2011 | Halldorsson | |
| 7,942,629 B2 | 5/2011 | Shi et al. | |
| 7,950,901 B2 | 5/2011 | Barbu et al. | |
| 7,954,372 B2 | 6/2011 | Brath et al. | |
| 7,987,067 B2 | 7/2011 | Harrison et al. | |
| 8,039,981 B2 | 10/2011 | Egedal et al. | |
| 8,076,789 B2 | 12/2011 | Miller | |
| 8,077,294 B1 | 12/2011 | Grund et al. | |
| 8,092,174 B2 | 1/2012 | Egedal | |
| 8,112,239 B2 | 2/2012 | Elisiussen | |
| 8,139,206 B2 | 3/2012 | Antoniou et al. | |
| 8,190,030 B2 | 5/2012 | Leclair et al. | |
| 8,316,716 B2 | 11/2012 | Kuhlmeier | |
| 8,427,649 B2 | 4/2013 | Hays et al. | |
| 8,495,911 B2 | 7/2013 | Andersen et al. | |
| 8,508,721 B2 | 8/2013 | Cates et al. | |
| 8,508,722 B2 | 8/2013 | Rogers et al. | |
| 8,508,723 B2 | 8/2013 | Mamidipudi et al. | |
| 8,511,988 B2 | 8/2013 | Birkemose et al. | |
| 8,538,735 B2 | 9/2013 | Taber, Jr. | |
| 8,622,698 B2 | 1/2014 | Kristoffersen | |
| 8,644,707 B2 | 2/2014 | Gianordoli et al. | |
| 8,670,591 B2 | 3/2014 | Mendez-Rodriguez et al. | |
| 8,687,173 B2 | 4/2014 | Rezk et al. | |
| 8,937,497 B1 * | 1/2015 | Tobin | 327/56 |
| 2004/0178945 A1 | 9/2004 | Buchanan | |
| 2006/0239312 A1 | 10/2006 | Kewitsch et al. | |
| 2009/0047030 A1 * | 2/2009 | Hoshida | 398/205 |
| 2009/0116962 A1 | 5/2009 | Pedersen et al. | |
| 2010/0195089 A1 | 8/2010 | Wu et al. | |
| 2010/0277714 A1 | 11/2010 | Pedersen et al. | |
| 2011/0037970 A1 | 2/2011 | Rogers et al. | |
| 2011/0091321 A1 | 4/2011 | Baker et al. | |
| 2011/0193344 A1 | 8/2011 | Lafferty et al. | |
| 2011/0212741 A1 * | 9/2011 | Lennartson et al. | 455/501 |
| 2012/0009064 A1 | 1/2012 | Baek et al. | |
| 2012/0056426 A1 | 3/2012 | Van Kuik et al. | |
| 2012/0133138 A1 | 5/2012 | Sorensen et al. | |
| 2012/0134802 A1 | 5/2012 | Westergaard et al. | |
| 2012/0169052 A1 | 7/2012 | Leipold-Buettner et al. | |
| 2012/0179376 A1 | 7/2012 | O'Brien et al. | |
| 2012/0206712 A1 | 8/2012 | Chang et al. | |
| 2012/0211986 A1 | 8/2012 | Bertolotti et al. | |
| 2012/0229792 A1 | 9/2012 | Fuglsang et al. | |
| 2013/0004312 A1 | 1/2013 | Friedrich et al. | |
| 2013/0023399 A1 * | 1/2013 | Agawa | 501/11 |
| 2013/0033040 A1 | 2/2013 | Bowyer et al. | |
| 2013/0057948 A1 | 3/2013 | Simonneau et al. | |
| 2013/0062880 A1 | 3/2013 | Bowyer et al. | |
| 2013/0083389 A1 | 4/2013 | Dakin et al. | |
| 2013/0094960 A1 | 4/2013 | Bowyer et al. | |
| 2013/0099497 A1 | 4/2013 | Bowyer et al. | |
| 2013/0103202 A1 | 4/2013 | Bowyer et al. | |
| 2013/0106107 A1 | 5/2013 | Spruce et al. | |
| 2013/0116831 A1 | 5/2013 | Rogers et al. | |
| 2013/0129508 A1 | 5/2013 | Spruce | |
| 2013/0134711 A1 | 5/2013 | Spruce | |
| 2013/0134712 A1 | 5/2013 | Rodriguez | |
| 2013/0162974 A1 | 6/2013 | Dakin et al. | |
| 2013/0166113 A1 | 6/2013 | Dakin et al. | |
| 2013/0184838 A1 | 7/2013 | Tchoryk, Jr. et al. | |
| 2013/0191027 A1 | 7/2013 | Ionov et al. | |
| 2013/0208256 A1 | 8/2013 | Mamidipudi et al. | |
| 2013/0259686 A1 | 10/2013 | Blom et al. | |
| 2013/0280033 A1 | 10/2013 | Babbitt et al. | |
| 2013/0297085 A1 | 11/2013 | Xiongzhe et al. | |
| 2013/0306321 A1 * | 11/2013 | Sartorius et al. | 250/338.4 |
| 2013/0334817 A1 | 12/2013 | Scholte-Wassink | |
| 2014/0017079 A1 | 1/2014 | Grabau | |
| 2014/0028496 A1 | 1/2014 | Schroeder et al. | |
| 2014/0035285 A1 | 2/2014 | Creaby et al. | |
| 2014/0043674 A1 * | 2/2014 | Takasaka et al. | 359/334 |
| 2014/0070538 A1 | 3/2014 | Bowyer et al. | |
| 2014/0097618 A1 | 4/2014 | Guadayol Roig | |
| 2014/0100800 A1 | 4/2014 | Prats | |
| 2014/0125058 A1 | 5/2014 | Olesen | |

FOREIGN PATENT DOCUMENTS

| | | |
|---|---|---|
| CN | 102043144 | 5/2011 |
| CN | 103368053 | 10/2013 |
| CN | 103758700 | 4/2014 |
| DE | 102009059668 | 6/2011 |
| DE | 102012019663 | 4/2014 |
| EP | 2615301 | 7/2013 |
| EP | 2623776 | 8/2013 |
| JP | 2002-118313 | 4/2002 |
| KR | 20130037428 | 4/2013 |
| KR | 20130114920 | 10/2013 |
| SE | 524485 | 12/2003 |
| WO | WO2004/077068 | 9/2004 |
| WO | WO2008/011067 | 1/2008 |
| WO | WO2011/150927 | 12/2011 |

(56) References Cited

FOREIGN PATENT DOCUMENTS

| WO | WO2011/150942 | 12/2011 |
|----|---------------|---------|
| WO | WO2012/044161 | 4/2012 |
| WO | WO2012/152280 | 11/2012 |
| WO | WO2013/000468 | 1/2013 |
| WO | WO2013/000473 | 1/2013 |
| WO | WO2013/000475 | 1/2013 |
| WO | WO2013/002194 | 1/2013 |
| WO | WO2013/004244 | 1/2013 |
| WO | WO2013/007258 | 1/2013 |
| WO | WO2013/050485 | 4/2013 |
| WO | WO2013/053361 | 4/2013 |
| WO | WO2013/079099 | 6/2013 |
| WO | WO2013/104391 | 7/2013 |
| WO | WO2013/104930 | 7/2013 |
| WO | WO2013/110276 | 8/2013 |
| WO | WO2013/117470 | 8/2013 |
| WO | WO2013/127899 | 9/2013 |
| WO | WO2013/139347 | 9/2013 |
| WO | WO2013/171154 | 11/2013 |
| WO | WO2013/182201 | 12/2013 |
| WO | WO2013/186211 | 12/2013 |
| WO | WO2014/015882 | 1/2014 |
| WO | WO2014/037452 | 3/2014 |
| WO | WO2014/040601 | 3/2014 |
| WO | WO2014/053136 | 4/2014 |

OTHER PUBLICATIONS

Desurvire, C.R. et al., Efficient erbium-doped fiber amplifier at a 1.53-μm wavelength with a high output saturation power, Optics Letters, vol. 14, No. 22, pp. 1266-1268, Nov. 15, 1989.

Kameyama, S. et al., Compact all-fiber pulsed coherent Doppler lidar system for wind sensing, Applied Optics, vol. 46, No. 11, pp. 1953-1962, Apr. 10, 2007.

Maeda, M.W. et al., An Electronically Tunable Fiber Laser with a Liquid-Crystal Etalon Filter as the Wavelength-Tuning Element, IEEE Photonics Technology Letters, vol. 2, No. 11, pp. 787-789, Nov. 1990.

Aranguren et al., Ultrasonic Wave-Based Structural Health Monitoring Embedded Instrument. Review of Scientific Instructions, vol. 84, Issue 12, 7 pages, Dec. 2013.

Choi et al., An all-Optical Gain-Controlled Amplifier for Bidirectional Transmission. ETRI Journal, vol. 28, No. 1, Feb. 2006.

Hyers et al., Condition Monitoring and Prognosis of Utility Scale Wind Turbines. Energy Materials, 2006, vol. 1, No. 3, pp. 187-203.

Kim et al., A Novel Bidirectional add/drop amplifier (BADA). Photonics Technology Letters, IEEE (vol. 10, Issue 8), Aug. 31, 1998, pp. 1118-1120.

Lee et al., Low-cost bidirectional optical amplifier using a unidirectional Er-doped fiber amplifier and a fiber Mach-Zehnder interferometer. Photonics Technology Letters, IEEE (vol. 13, Issue: 1) on Jan. 31, 2001, pp. 76-78.

Lidar Measures Condition of Wind Turbines Remotely, http://optics.org/news/5/2/9. Published on Feb. 13, 2014.

Long et al., Application of Fiber-Optic Transmission in Digital Array Radar. Modern Radar. vol. 30, Issue 10, on Oct. 2008, pp. 57-60.

Marquez et al., Condition Monitoring of Wind Turbines: Techniques and Methods. Renewable Energy 46 (2012), pp. 169-178, published online on Apr. 5, 2012.

International Search Report and Written Opinion dated Feb. 2, 2015, PCT Application No. PCT/US2014/061416, filed on Oct. 20, 2015.

* cited by examiner

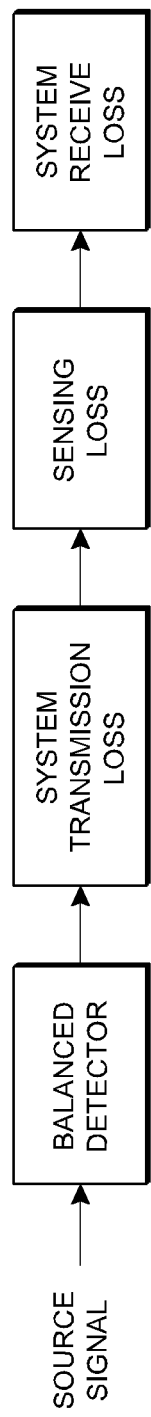
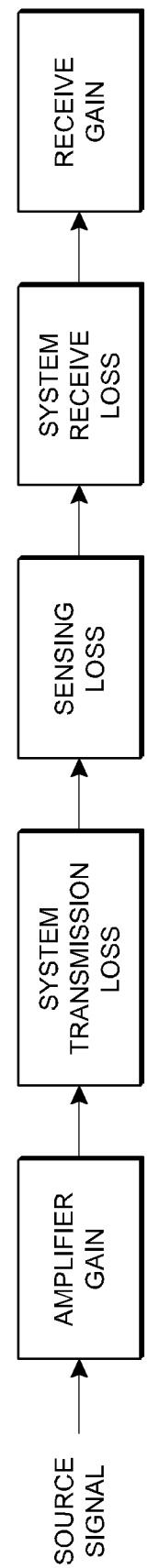
SYSTEM GAIN(dB) = AG(dB) - STL(dB) - SL(dB) - SRL(dB)
FIG. 2
SYSTEM GAIN(dB) = AG(dB) - STL(dB) - SL(dB) - SRL(dB) + RG(dB)
FIG. 3

AMPLIFIED OPTICAL CIRCUIT

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND OF THE INVENTIONS

Field of the Inventions

Embodiments of the subject matter described herein relate generally to optical circuits which can include amplifiers and can be used as part of sensing apparatuses and for sensing methods such as Laser Imaging, Detection and Ranging (LIDAR) applications.

Description of the Related Art

Optical circuits are used in many different fields, including telecommunications and sensing technologies. In the telecommunications related technologies, light is primarily used as a carrier for digital communications. In such systems, the light remains contained within devices and circuitry which may be formed with integrated optical circuits, fiber optics, and other devices.

Optical circuits are also incorporated into certain types of sensing devices, such as velocimeters which can be used for detecting the velocity of a moving fluid, such as liquid within a pipe or atmospheric wind. Such sensing devices are known a laser doppler velocimeters (LDV). Such LDV devices have been incorporated into LIDAR systems, as well as other types of systems. LIDAR has been used for applications such as examination of surfaces of the earth. For example, LIDAR systems have been mounted in aircraft and flown over target during which light, in the form of a pulsed laser, is directed at surface features and the laser is used to measure ranges (variable distances) to the surfaces of the earth. The light pulses, combined with other data recorded by the airborne system, are used to generate precise, three dimensional information about the shape of the target area and its surface characteristics.

Recently, similar LIDAR systems have been developed for detecting wind velocities of wind approaching wind turbines, for optimizing operation of the wind turbines. In such systems, a pulsed laser light is discharged through a telescope, whereafter, the laser light strikes air molecules or particles suspended in the moving air, such as dust particles. Some of the laser light is reflected back to the telescope and is received by the LIDAR device. A sample of the original pulse laser light and some of the reflected laser light is processed to calculate a velocity of the wind, using known Doppler-based calculations.

While there are some similarities in the optical hardware used in telecommunications and LDV applications, energy magnitudes utilized in telecommunications hardware are orders of magnitude below the energy levels used for some LIDAR and environmental LDV applications. As such, some telecommunications hardware might be destroyed if they were used to transmit light at energy levels used in some environmental LDV applications.

SUMMARY OF THE INVENTION

An aspect of at least some of the inventions disclosed herein includes the realization that the cost of certain types of optical circuits, such as amplified optical circuits used in environmental LDV applications, can be significantly reduced by using a bidirectional amplifier for amplifying light prior to emission from a transceiver and amplifying reflected light returning to the transceiver, and before being processed for velocity calculations. For example, some known LDV devices include one or more amplifiers for amplifying the energy level of source radiation prior to transmission out of a transceiver such as a telescope. The energy level of the reflected light received by the telescope is quite low and has been identified as a cause of some drawbacks.

Laser doppler velocimeter designs such as those noted above have been applied to systems used for detecting airflow into a wind turbine. Some wind turbines are quite large, presently, as large as 110 meters in diameter. Thus, LDVs designed for wind turbine use often include a plurality of channels, such as three or more channels. Using multiple channels provides for a more accurate detection of wind speeds approaching a large wind turbine, which can vary significantly. Thus, a significant part of the cost of the optical circuits used for such LDVs is attributed to the number of amplifiers used in the circuit.

An aspect of at least one of the inventions disclosed herein includes the realization that significant cost savings can be realized by incorporating bidirectional amplifiers such that at least one bidirectional amplifier amplifies source light prior to being transmitted out of a transceiver and again amplifies the reflected light after being received by the transceiver. The amplified reflected light can then be guided to further hardware, such as a balanced detector or other signal processors which are commonly used in the LDV arts.

Thus, in accordance with an embodiment, an optical circuit can comprise a source of radiation, at least a first bidirectional optical amplifier, and a transceiver. The optical circuit can also include a reflected light output. An optical waveguide circuit can couple light from the radiation source, the first bidirectional optical amplifier, the transceiver, and the reflected light output. The optical waveguide circuit can comprise a first optical waveguide coupling light from the radiation source to an upstream side of the first bidirectional amplifier. A second optical waveguide can couple light from a downstream side of the first bidirectional amplifier with an upstream side of the transceiver. A third optical waveguide can connect the upstream side of the first bidirectional amplifier with the reflected light output.

As such, the bidirectional amplifier can be used to both amplify light from the source, prior to being transmitted out of the transceiver, and also amplify the reflected light received by the transceiver. The amplified, reflected light can then be used to determine a velocity of the wind into which the amplified source light is transmitted, using known Doppler-based techniques and calculations.

Another aspect of at least one of the inventions disclosed herein includes the realization that additional techniques can also be used, alone or in conjunction with bidirectional amplifiers noted above, to further reduce costs associated with some optical circuits, including optical circuits used for laser doppler velocimetry. For example, an aspect of at least one of the inventions disclosed herein includes the realization that passive or active switches can be used to apply multiplexing to optical circuits so as to reduce component cost and/or increase the number of telescopes that can be utilized for sensing using a single source of radiation energy.

Thus, in some embodiments, an optical circuit can include a source of radiation, at least one bi-directional amplifier, at least one switch, and a radiation transceiver. The circuit can be connected with one or more waveguides guiding radiation from the radiation source, through the bi-directional amplifier, then through the switch, and through the plurality of telescopes connected to the switch. Reflected light returning to the telescopes, by way of the waveguides, passes back through the switch, to the bi-directional amplifier, and then to a radiation reflected light output.

As such, the above optical circuits benefit from the cost savings associated with multiplexing and the bidirectional amplification using a bidirectional amplifier.

In some embodiments, a laser Doppler velocimeter can comprise a source of radiation, at least a first bidirectional optical amplifier, a transceiver, a signal processor, and an optical waveguide. The optical waveguide can comprise a first waveguide and a second waveguide. The first waveguide can extend between the source of radiation and the transceiver and be configured to guide radiation from the source of radiation, through the first bidirectional amplifier in a first direction and to the transceiver. The second optical waveguide can extend between the transceiver and the signal processor and be configured to guide reflected light received by the transceiver, through the first bidirectional amplifier in a second direction opposite the first direction, and to the signal processor.

Another aspect of at least one of the inventions disclosed herein includes the realization that a waveguide in an optical circuit designed for an LDV application can provide a convenient signal, by way of predictable internal reflections, that can be used for calibration purposes. For example, during operation of an optical circuit designed for an LDV application, reflections are generated by imperfections in the waveguide. The locations at which the reflections are generated remain generally fixed. Thus, when a light source such as a laser of a circuit is pulsed, a series of reflected pulses, reflected from the imperfections in the waveguide, are received at the photo detector. These reflections can be assumed to correspond to no movement or zero velocity. Thus, processing electronics attached to the balance detector can use the output associated with these reflections as reference or calibration signals that correspond to zero velocity.

Another aspect of at least one of the inventions disclosed herein includes the realization that component costs of certain optical circuits, such as those used for laser Doppler velocimeter applications, can be reduced while retaining acceptable performance for LDV applications through selective use of polarization management. For example, optical circuits can be made with components that preserve the polarization of light traveling there through, such as Polarization Maintaining (PM) optical fibers. These components are roughly 25 to 35% more expensive than components that do not maintain the polarization (e.g., "Single Mode" optical fibers) of light traveling there through. If an optical circuit for an LDV is made with components that do not maintain the polarization of light traveling there through, the polarization of the light propagating there through will shift, which can cause inaccuracies in downstream processing of the light, resulting in dropouts of output. This is because as the polarization of light traveling through the circuit changes, the energy levels of the light reaching different components varies unpredictably and can result in energy levels too low for the components to operate properly, and particularly, photo receptors. On the other hand, some components can operate properly on light signals having arbitrary polarization orientations.

An aspect of at least one of the inventions disclosed herein includes the realization that an optical circuit for an LDV application can be formed of non-polarization maintaining components and thereby benefit from significantly reduced cost and can include a polarization controller on a portion of the optical circuit just upstream from polarization sensitive components, for example, a balance detector. Further, another aspect of at least one of the inventions disclosed herein includes the realization that a passive polarization controller is a low cost option that generates only a small, acceptable loss of signal for some applications. For example, an optical circuit for an LDV application can include a passive polarization controller disposed between a circulator and a balance detector can be configured to passively split a reflected light signal into orthogonal components, rotate one of the components, then recombine the components together, thereby rearranging a signal having an arbitrary polarization alignment into a realigned polarized signal which is better suited for detection in the photo receptors of the balance detector and thereby providing a more reliable output.

Another aspect of at least one of the inventions disclosed herein includes the realization that in certain environments of use of LDVs, certain predictable events occur which generate invalid data. For example, when an LDV device is mounted to the nacelle of a wind turbine, the blades of the wind turbine pass in front of the LDV, for example, typically three times per revolution (for a three-bladed turbine). When the blades pass in front of the LDV device, any velocity determination would be zero or approximately zero. However, after the blade moves out of the way of the LDV, wind speed calculations would be based on wind speed. Thus, during operation of a wind turbine, there is a repeating cycle of invalid wind velocity data.

Thus, in accordance with at least one of the embodiments disclosed herein, a method of outputting wind velocity data can include determining whether a wind turbine blade is blocking an LDV device, and either blocking the recordation of such data or recording data associated with the wind velocity calculations generated during the blocking event with an indication that the wind velocity calculations are invalid.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 2 is a schematic diagram illustrating a calculation of system gain for the optical circuit of FIG. 1;

FIG. 3 is a schematic block diagram illustrating a technique for calculating system gain of an optical circuit having an additional amplifier, such as that illustrated in FIG. 4;

DETAILED DESCRIPTION OF THE PREFERRED EMBODIMENT

Figure 1:
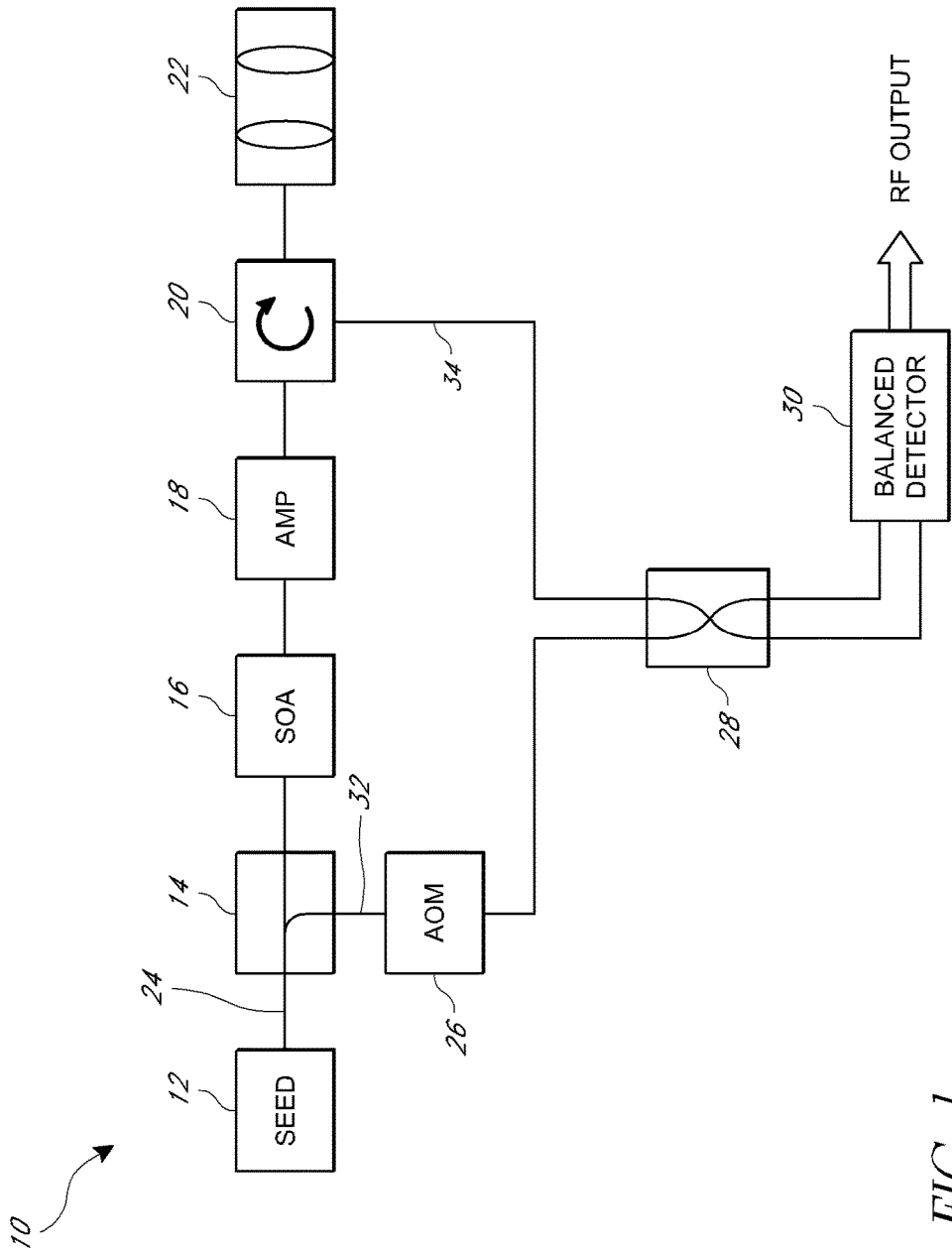
FIG. 1 is a schematic block diagram illustrating a prior art optical circuit used for a LIDAR optical system.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the proceeding technical field, background, brief summary, or the following detailed description.

Certain terminology may be used in the following description for the purpose of reference only, and thus are not intended to be limiting. For example, terms such as "upstream". "downstream", "upper", "lower", "above", and "below" refer to directions in the drawings to which reference is made. Terms such as "proximal", "distal", "front", "back", "rear", and "side" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second", and other such numerical terms referring to structures.

FIGS. 4-17 illustrate various embodiments of optical circuits that can be used for a variety of purposes. The embodiments of FIGS. 4-17 are described in the context of optical circuits used for laser doppler velocimeters (LDVs) because they have particular utility in this context. However, the optical circuits of those herein can be used in a variety of other contexts, such as, for example, but without limitation (non-LDVs) and LDVs for applications including, but without limitation, control for wind turbines.

FIG. 1 illustrates a prior art optical circuit 10, which is described below to provide some context for understanding the inventions disclosed in the present application. The art optical circuit 10 includes a radiation source 12, a splitter 14, a first amplifier 16, a second amplifier 18, a circulator 20 and a transceiver 22, all of which are disposed along a first optical waveguide, which is formed in part by optical fiber 24 connecting each of the devices 12, 14, 16, 18, 20, and 22. The optical circuit 10 also includes an acoustic optical modulator (AOM) 26, a mixer 28 and a balance detector 30. Additional optical fiber 32 forms an optical waveguide connecting the splitter 14, modulator 26, coupler 28, and the balance detector 30. Additionally, optical fiber 34 connects the circulator with the coupler 28 and the balance detector 30.

The radiation source can be 12 as in the form of a "seed" a term typically used to refer to a narrow line width "seed" laser, typically a distributed feedback laser (DFB). The splitter 14 can be in the form of a passive fiberoptic splitter having one input and two outputs. The first output providing optical radiation to devices 16, 18, 20, and 22 (the send leg) leaving the remainder of the output as a local oscillator (LO).

The first amplifier 16 is a semiconductor optical amplifier (SOA) which is configured to shape the send leg portion of the output of the radiation source 12 into a pulse.

The second amplifier 18 is a fiber based optical amplifier. The transceiver 22 is in the form of a telescope. The optical fiber 24 connects the seed laser 12 with the splitter 14, the semiconductor optical amplifier 16, the fiber based optical amplifier 18, the circulator 20, and the telescope 22. Thus, some of the light emitted from the seed laser 12 is transmitted out of the telescope 22, reflects off of bodies such as dust suspended in atmospheric air, and is reflected back into the telescope 22 which guides the reflected light back to the circulator 20. Light entering the circulator 20 from the telescope 22 is directed to the mixer 28 and the balance detector by way of the optical fiber 34. Additionally, the optical fiber 32 directs light from the splitter to the acoustic optical modulator 26 and to the mixer 28 and the balance detector 30. As such, using known techniques, the balance detector 30 can be used to calculate a velocity of the matter that reflects light back into the telescope 22. As such, the optical circuit 10 can be used to form parts of a laser doppler velocimeter LDV.

Conventional LDVs, such as that illustrated in FIG. 1, transmit light to a target region (e.g., into the atmosphere) and receive a portion of that light after it has scattered and/or reflected from the target region or scatterers in the target region. This received light is processed by the LDV to obtain doppler frequency shift, $f_D$. The LDV then conveys the velocity of the target relative to the LDV, v, by the relationship $v=(0.5)c\Delta f_D/f_t$, where $f_t$ is the frequency of the transmitted light, $\Delta f_D=(f_D-f_t)$, and c is the speed of light in the medium between the LDV and the target.

LDVs are extremely useful and have a wide range of applications including, but not limited to, blood flow measurements, speed limit enforcement, spaceship navigation, projectile tracking, and air speed measurement.

In operation, the optical circuit 10 of FIG. 1 emits light energy from the telescope 22. The light energy strikes airborne "scatterers" (air molecules, dust or other particulates) in a target region, resulting in back-reflected or back-scattered light energy reaching the telescope 22. A portion of the back-scattered energy is collected by the telescope 22. This is known as a "monostatic" configuration.

The reflected light 22 is guided to the circulator 20 which directs the reflected light into the optical fiber 34 and to the mixing device 28, which is a 2×2 coupler in the device of FIG. 1. For purposes of supporting a Doppler calculation, some of the light from the radiation source 12 is guided, by way of the splitter 14, through the acoustic optical modulator 26, and the optical fiber 32, to the mixing device 28. For example, the mixing device 28 can combine the light in such a way that the light will have the same polarization and occupy the same space and then direct the resulting mixed light onto a photodetector with a bandwidth sufficient to detect a measured Doppler frequency shift. The photodetector, such as the balance detector 30, can produce an electrical current for example "RF OUTPUT" which includes a component with a frequency that is the mathematical difference between the frequency of the reference light provided through the optical fiber 32 and the reflected light provided through the optical fiber 34. Such an electrical signal can be analyzed by known signal processors for example electrical spectrum analyzers or frequency counters to determine a frequency difference and to calculate a relative velocity component along an axis of the telescope 22. Such prior art devices and use are well known in the art of LDVs and are disclosed in U.S. Pat. No. 5,272,513 which is herein incorporated by reference.

With reference to FIG. 2, a total system gain of the optical circuit 10 can be calculated by summing gains and losses caused by various components of the circuit 10. For example, beginning with the light emitted from the radiation source 12, the gains of the amplifiers 16 and 18 (AG) can be summed. The circulator 20 and telescope 22 can be considered as passive components inherently generating some loss. The losses associated with the circulator 20 and the telescope 22 can be summed as System Transmission Loss (STL). A tiny amount of light emitted from the telescope 22 is reflected back into the telescope 22 such that the telescope 22 captures the reflected light. This loss can be referred to as a Sensing Loss (SL). The light received by the telescope, and directed to the mixer 28 and the balance detector 30 suffers further losses which are represented by System Receive Loss (SRL). As illustrated in FIG. 2, summing the gains and losses provides a calculation of an overall "SYSTEM GAIN".

In some applications, such as sensing wind velocity at long range, a small fraction of light energy emitted by the telescope 22 is reflected back into the telescope 22. Thus, the Sensing Loss SL noted above with regard to the calculation of FIG. 2 can be quite large, resulting in a highly attenuated, low-power signal reaching the mixer 28 and the balance detector 30. This can result in a small and varying signal-to-noise ratio. For example, atmospheric conditions can vary significantly over time, for example, the amount of available reflective bodies suspended in air, such as dust, can change greatly the amount of signal of reflected light received by the telescope 22.

With reference to FIG. 3, one approach for improving the signal comprised of reflected light received by the telescope 22 is to add an amplifier for amplifying reflected light received by the telescope 22. Thus, with reference to FIG. 3, a system gain calculation can result in a higher gain or less loss by adding the gain from an additional amplifier, represented by Receive Gain (RG) as illustrated in FIG. 3.

Figure 4:
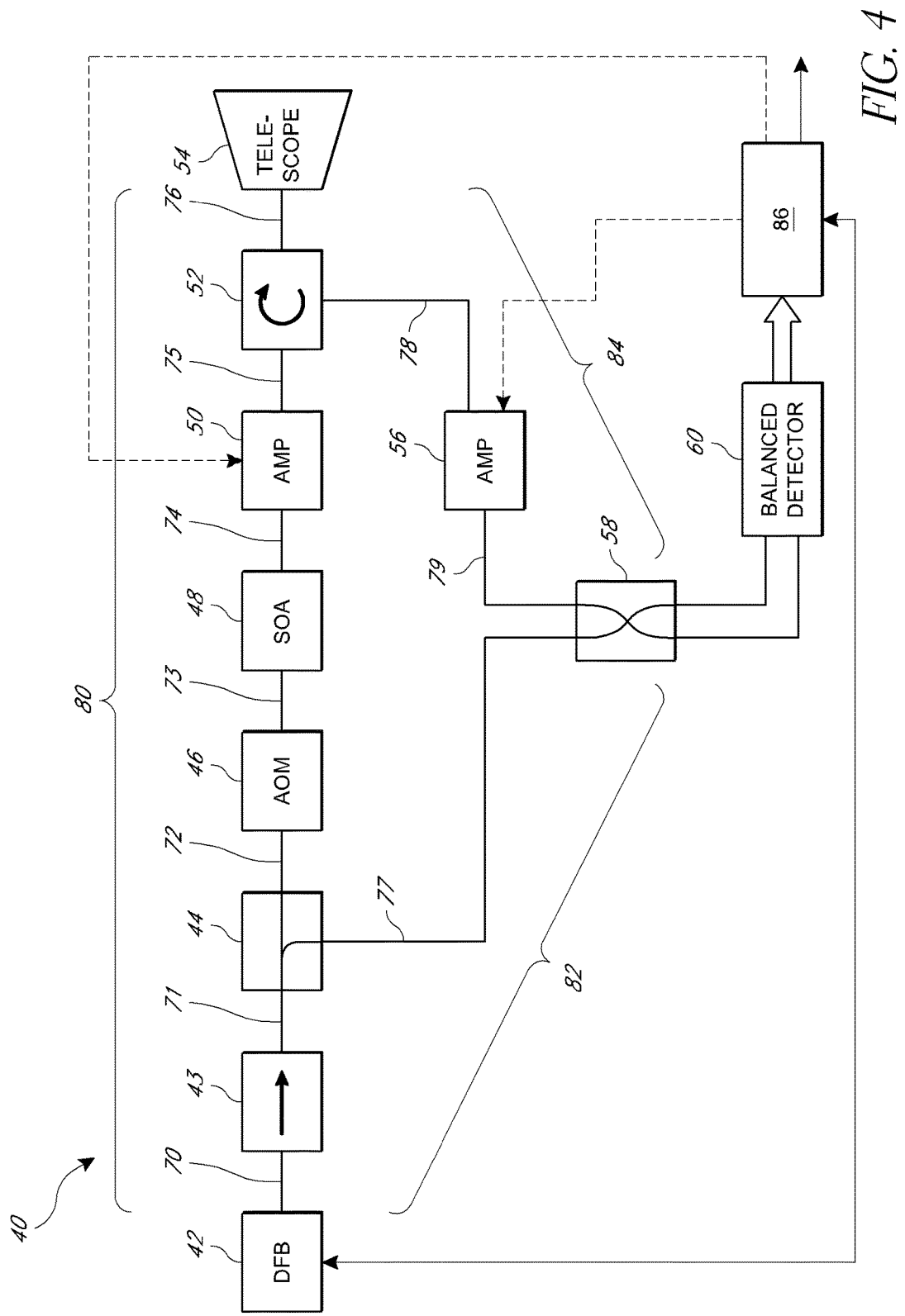
FIG. 4 is a schematic block diagram of an embodiment of an optical circuit.
Figure 6:
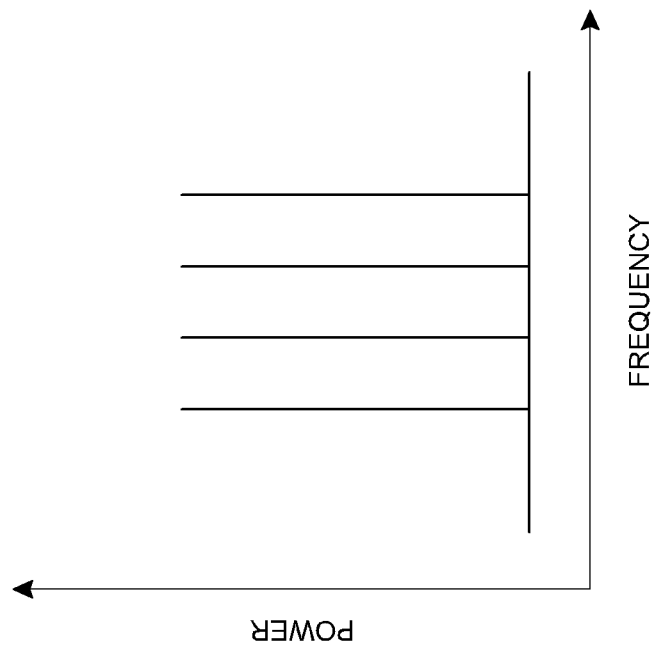
FIG. 6 is a graph illustrating the power and frequencies of output of optional lasers that can be incorporated into the circuits of FIGS. 4 and 7-12 using an optional modulation technique and/or hardware.

FIG. 4 illustrates an embodiment of an improved optical circuit 40. The optical circuit 40 can include a radiation source 42, an isolator 43, a splitter 44, a frequency shifting device 46, a first amplifier 48, a second amplifier 50, a circulator 52, a light transceiver 54, a receiver amplifier 56, a mixing device 58, and a balance detector 60. All of the above-noted components of the optical circuit 40 can be connected to one another using optical fibers which can be considered as forming optical waveguides in conjunction with and a combination of the components noted above. As noted above, the optical circuit 40 can be incorporated into an LDV device. Some LDV devices can be configured with multiple channels, the optical circuit 40 of FIG. 4 representing one channel. Thus, the circuit 40 illustrated in FIG. 4 can be considered as forming a single channel of a multi-channel LDV device. Other embodiments, described below with reference to FIGS. 11, 12, 13, and 18 include switches and/or splitters for multiplexing thereby using most of the components of a single optical circuit in conjunction with a plurality of telescopes for sensing velocities at a plurality of different locations.

In the illustrated optical circuit 40, optical fibers 70, 71, 72, 73, 74, 75, and 76 connect the radiation source 42 with the telescope 54 by way of the beam shaper 43, splitter 44, modulator 46, first amplifier 48, second amplifier 50, and circulator 52. As such, the fibers 71, 72, 73, 74, 75, and 76 and the beam shaper 43, splitter 44, modulator 46, first amplifier 48, second amplifier 50, and circulator 52 can be considered as forming a first optical waveguide connecting the radiation source 42 with the telescope 54. As such, the first optical waveguide is referred to as with reference numeral 80. An additional optical fiber 77 connects the splitter 44 with the mixing device 58. Further, an optical fiber 78 connects the circulator 52 with the third amplifier 56 and optical fiber 79 connects the third amplifier 56 with the mixing device 58. A such, the optical fibers 70, 71, and 77 and the beam shaper 43 and splitter 44 can be considered as forming a second waveguide 82 connecting the radiation source 42 with the mixing device 58. Similarly, the optical fibers 76, 78, 79 and the circulator 52 and third amplifier 56 can be considered as forming a third optical waveguide 84 connecting the telescope 54 with the mixing device 58 so as to guide reflected light received by the telescope 54 to the mixing device 58. Thus, it is to be understood that the terms "optical waveguides" are intended to refer to any combination of components of an optical circuit that guide light along a particular path, whether or not any of those components also form parts of other waveguides which guide light in other directions, including opposite directions. For example, the optical fiber 76 forms part of the first optical waveguide 80 guiding light from the radiation source 42 to the telescope 54 as well as a part of the third optical waveguide 84 which guide light from the telescope to the mixing device 58, in the opposite direction as the optical waveguide 80.

The radiation source 42 can be any type of radiation source. In the illustrated embodiment of FIG. 4, the radiation source 42 is a distributed feedback (DFB) laser. Optionally, the laser forming the radiation source 42 can be in the form of small laser diodes (single frequency or gain switched), short-cavity fiber lasers, and miniature solid-state lasers such as, for example, non-planar ring oscillators, or hybrid silicon lasers. Other types of lasers and radiation sources can also be used.

Optionally, the circuit 40 can include an isolator 43 configured to prevent reflected radiation from downstream components from feeding back into the radiation source 42.

Figure 5:
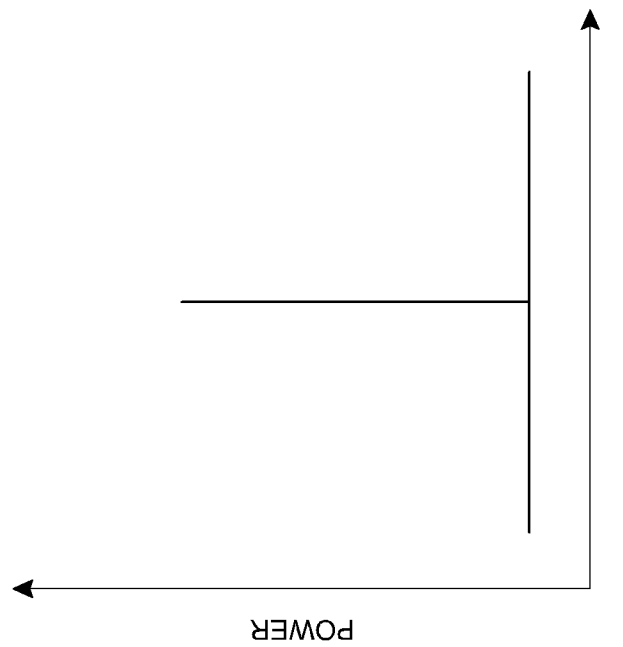
FIG. 5 is a graph schematically illustrating optional power and frequency of the output of a laser source incorporated into the embodiments of FIGS. 4 and 7-12.

However, optionally, the device 43 can be in the form of a modulator configured to modulate amplitude and phase of light from the source 42. For example, the device 43 can be in the form of commercially available LiNbO3 modulators or other devices, which can be configured to transform the output spectrum of the light output from the source 42. For example, the output of the source 42 is illustrated in FIG. 5, as having a single line of narrow line width. The modulator 43 can be configured to modulate the output of the source 42 illustrated in FIG. 5 into an output represented by the graph of FIG. 6 which includes a plurality of single lines, each having the same narrow line width as the output of the source 42. This has the advantage in that each line of the set of lines of FIG. 7 can be amplified to the stimulated brillouin scattering (SBS) limit.

Figure 7:
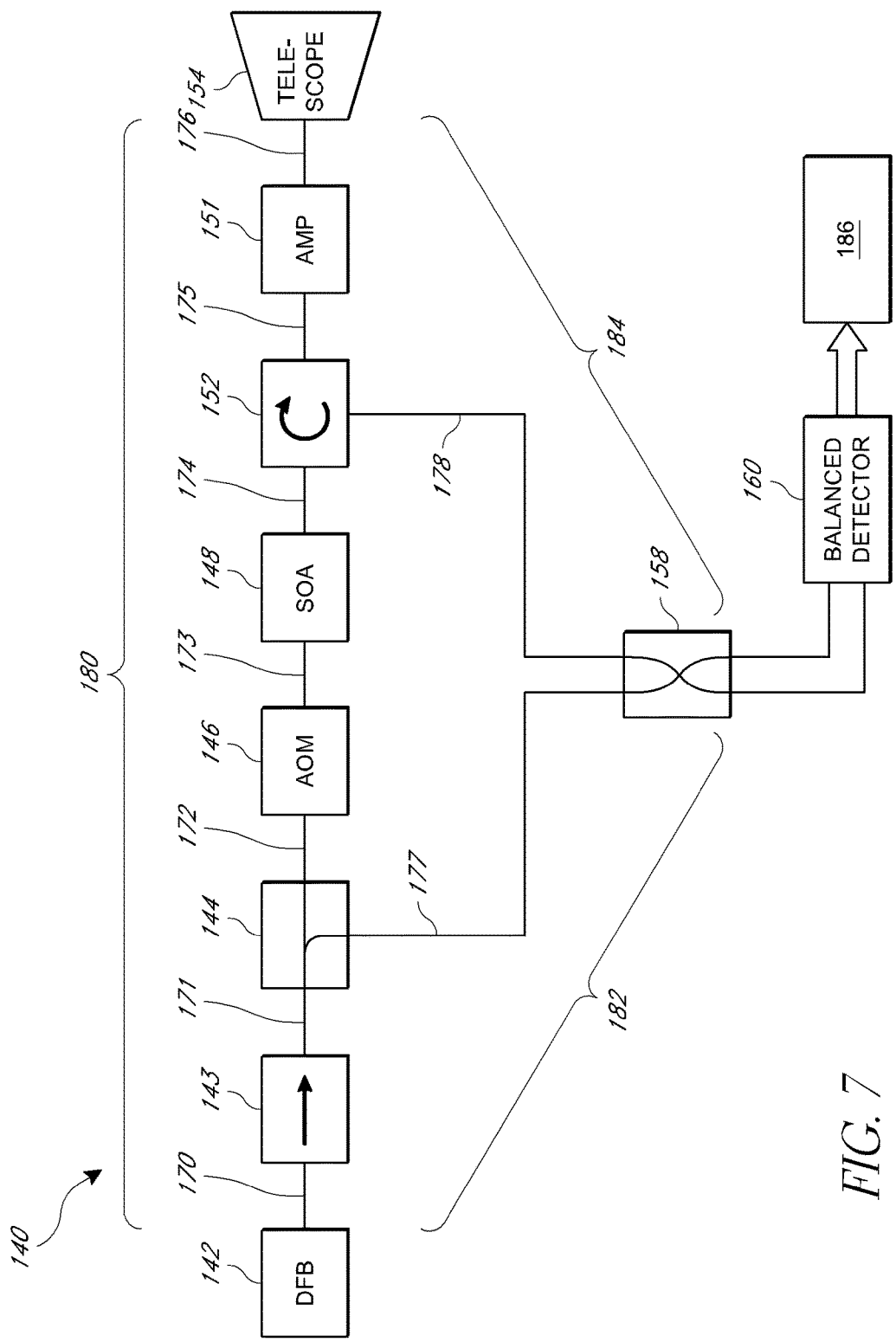
FIG. 7 is a schematic diagram of an optical circuit having a bidirectional amplifier.

An aspect of at least one of the inventions disclosed herein includes the realization that limitations caused by the effect known as the "stimulated brillouin scattering" (SBS) an be avoided by modulating the output of the source 42 as described above with reference to FIGS. 6 and 7. More specifically, pulses of light energy, for example, on the order of 150 nanoseconds, can be sent through optical fiber amplifiers. Such output pulse energy can be limited by the SBS effect. SBS limits the maximum power achievable in a single frequency. This effect can be avoided, as noted above, by increasing the size of the optical mode within the fiber or by broadening the spectral width of the optical signal that is being amplified. Thus, by modulating the output of the source 42 into a plurality of narrow line width frequencies as illustrated in FIG. 7, for example, N lines, the total output power of the amplifier can then be raised to N times the SBS limit of a single line.

The splitter 44 can be formed with any type of passive optical splitter or other types of splitters which are well known in the art. Optionally, the splitter 44 can be in the form of a 90-10 splitter. For example, the splitter 44 can be configured to divide the incoming radiation from the source 42 into two paths, the first path including 90% of the radiation from the source 42 and extending to the optical fiber 72. The remaining 10% of the radiation 42 can be split and directed to the optical fiber 77. Those of ordinary skill in the art understand that although the splitter 44 is described as a "90-10" splitter, the splitter 44 does have an associated loss of energy.

The acoustic optical modulator 46 can be in the form of any known frequency shifter, and can be in the form of well know acousto-optic modulators (AOM). Associated RF drivers can provide a radio frequency offset to the laser source output. This offset facilitates the later determination by a signal processor of the direction of any detected motion. The offset is provided by utilizing the acousto-optic effect, i.e., the modification of a refractive index by the oscillating mechanical pressure of a sound wave. In an AOM, the input laser beam is passed through a transparent crystal or glass. A piezoelectric transducer attached to the crystal is used to excite a high frequency sound wave (with a frequency on the order of 100 megahertz). The input light experiences Bragg defraction at the periodic refractive index grating generated by the sound wave. The scatter beam has a slightly modified optical frequency (increased or decreased by the frequency of the sound wave). The frequency of the scatter beam can be controlled via the frequency of the sound wave, while the AOM electronic controller controls the acoustic power, consequently, controlling the output optical power. In this way, the frequency shifting provided by the AOM 46 can be used to provide a frequency offset to that of the laser output from the source 42. The AOM 46 can also be used as an optical modulator to modulate laser signals from the source 42 in order to obtain pulsed LIDAR measurements. Other types of optical modulators can also be used.

The first amplifier 48 can be in the form of a semiconductor optical amplifier (SOA). As such, the first amplifier 48, in the form of an SOA, can provide additional modulation of the laser output from the source 42. For example, the SOA 48 can induce pulsing that can be used to optimize the extinction ratio of the pulses. For example, the SOA 48 may be configured to provide primary as well as secondary modulation of the laser output from the source 42. The SOA 48 can also be configured to provide optical amplification to the laser source signal.

The second amplifier 50 can be any type of optical amplifier. For example, but without limitation, the second amplifier 50 can be a semiconductor-based booster optical amplifier or a fiberoptic amplifier. In the form of a fiberoptic amplifier, the amplifier 50 can include a length of fiber doped by a rare earth element such as for example, erbium (ER), erbium-ytterbium (ER:YB), etc. In such an amplifier, a single mode (SM) or multimode (MM) pump diode is used to excite the dopant material within the doped fiber. The amplifier 50 can be configured to amplify incoming light to a level below the power limit dictated by optical damage and nonlinear effects of the fibers. Optionally, spontaneous emission from the optical amplifier 50 can be managed with the use of narrowband bulk filters or fiber Bragg grating (FBG) based filters.

The circulator 52 can be any type of known circulator. In the illustrated embodiment, the circulator 52 receives light from the source 42 by way of the optical fiber 75 and outputs light to the telescope 54 by way of optical fiber 76. Additionally, light guided into the circulator 52 from the optical fiber 76 is output by the circulator 52 by way of the optical fiber 78.

The telescope 54 can include an arrangement of lenses configured to project the light incoming from optical fiber 76 onto a target object or region. Such arrangements, sizing, and spacing of lenses forming such telescopes is well known in the art and is not described further. Additionally, the telescope 54 can receive reflected light and focus the reflected light into the optical fiber 76 and thereby guide the reflected light in a reverse direction relative to the light supplied to the telescope by optical fiber 76. Other types of telescopes can also be used.

The third amplifier 56 can be any type of amplifier, such as those noted above with reference to this second amplifier 50. The mixing device 58 can be in the form of a 2×2 optic coupler, which is well known in the art. Optionally, the mixing device 58 can be in the form of an optical mixer which may be in the form of a 3 dB fiber optic coupler, which can be configured to generally produce two output beams of opposite phase. The two output beams are then applied to an electro optic receiver, such as the balanced detector 60. Optionally, the balanced receiver 60 can be comprised of a pair of matched photo diodes with a transimpedance amplifier to convert the optical radiation received into a voltage signal. Additionally, with regard to all of the descriptions included herein, a number of standard components typically incorporated into optical circuitry are not described in the present specification. Such components include but are not limited to polarizers, isolators, filters, and attenuators. Such components can be included in optical systems for conditioning optical signals through various segments of systems to suppress anomalies and system behavior. One or more of such components can be placed in any of the segments of the optical circuits disclosed herein and in many cases, the order of those components is interchangeable. Those of ordinary skill in the art fully understand the use of such components to achieve stable operation of LDV, and LIDAR optical circuitry.

Optionally, the optical circuit 40 can include a controller 86. The controller may be in the form of a hardwired control circuit, which can be wired to perform feedback control and any of the functions described herein. Alternatively, the controller 86 can be constructed of a dedicated processor and memory for storing a computer program configured to perform methods, processes, and/or steps described below. Additionally, the controller 86 can be constructed of a general purpose computer having a general purpose processor and memory for storing an operating system and a computer program for performing methods, processes, or steps described herein. Additionally, the controller 86 can be connected to a various number of devices other than those specifically described herein.

As noted above, the balance detector 60 can be configured to perform known operations on the signal output from the mixing device 58, including outputting an electrical signal ("RF OUTPUT") indicative of a frequency difference. The controller 86 can be configured to receive the electrical signal from the balance detector 60 so as to calculate a wind velocity based on the frequency difference indicated by the output of the balance detector. Such a technique is well known in the art and is not described in further detail.

Additionally, the controller 86 can optionally be configured to provide variable amplifier control. For example, amplifiers 50, 56 as well as other amplifiers such as amplifier 151 described below can be configured to provide variable gain. For example, in some embodiments, control circuitry can be provided for varying an amount of current supplied to the amplifiers 50, 56, 151 to thereby control, limit or adjust the amount of gain provided by the amplifiers 50, 56, 151. Other types of variable gain techniques can also be used.

Additionally, the controller 86 can be configured to control activation of the radiation source 42. Additional operations and configurations of the controller 86 are described below with reference to FIGS. 19-22.

By including the third amplifier 56, the optical circuit 40 alleviates the problems associated with loss of signal described above with reference to FIGS. 2 and 3.

Another aspect of at least one of the inventions disclosed herein includes the realization that providing amplification in two phases has a number of beneficial effects. Firstly, as an example, it may be desirable to provide 40 dB to the radiation emitted from the first amplifier 48. However, a 40 dB amplifier is quite expensive. Further, commercially available 20 dB amplifiers are less than half the cost of a single 40 dB amplifier. Thus, the optical circuit 40 can be constructed with the same effective system gain, but less expensively by replacing a 40 dB amplifier with two 20 dB amplifiers. However, a further benefit is achieved by spacing the two amplifiers so that one is upstream from the transceiver 54 and one is downstream from the transceiver 54.

For example, radiation that is discharged from an amplifier prior to being discharged out of a transceiver such as a telescope 54, is reflected back into the optical circuit by imperfections that are inherently present in optical fibers and transceivers like telescopes. Thus, with reference to FIG. 4 for example, amplified radiation discharged from the amplifier 50 is reflected by imperfections in the optical fiber 76 and the telescope 54. Those reflections are directed to the balance detector 60 through the circulator 52 and optical fibers 78 and 79. These reflections have not been subject to the losses caused by traveling through atmospheric air with only a tiny fraction of the radiation being reflected back to the telescope 54. Thus, these internal reflections have a high energy state; much higher in energy than the reflected energy of interest associated with reflections of moving particles from the target region. As such, these internal reflections can cause "blinding" of the balance detector, for example, a photo receptor within the balance detector 60.

Thus by using a smaller amplifier as the amplifier 50, the internal reflections generated by the optical fiber 76 and the telescope 54 are smaller. As such, the amount of internal reflections reaching the balance detector 60 can be reduced.

An aspect of at least one of the inventions disclosed herein includes the realization that the benefits of the amplification of reflected light from the telescope, such as that described above with reference to FIG. 4, can be achieved while also reducing the number of amplifiers by including a bidirectional amplifier. Such an optical circuit is described below with reference to FIG. 7.

FIG. 7 illustrates an optical circuit 140 which is a modification of the optical circuit 40. Components of the optical circuit 140 that are similar or the same as corresponding components of the optical circuit 40 are identified with the same reference numeral except that 100 has been added thereto.

With continued reference to FIG. 7, the optical circuit 140 is different from the optical circuit 40 in that the circulator 152 is disposed between the first amplifier 148 and the second amplifier 151. Additionally, the second amplifier 151 is in the form of a bidirectional amplifier. For example, the bidirectional amplifier 151 can be NuPhoton EDFA-Nano amplifier. Further, in this context, the amplifier 151 can be considered as having an upstream side connected to the optical fiber 175 and a downstream side connected to the optical fiber 176.

As such, light from the source 142 is provided to the upstream side of the amplifier 151 by way of the optical fiber 175 and the first optical waveguide 180, amplified by the amplifier 151, and the amplified light is discharged from the downstream end through the optical fiber 176 and guided to the telescope 154. Reflected light enters the telescope 154 and is provided to the upstream side of the amplifier 151 by way of the optical fiber 176, is amplified by the bidirectional amplifier 151, and then the amplified reflected light is discharged from the bidirectional amplifier 151 by way of the optical fiber 175. The amplified reflected light is then guided to the circulator 152 which directs the amplified reflected light to the mixing device 158 by way of the optical fiber 178 along the optical waveguide 184.

As such, as noted above, the optical circuit 140 achieves the benefit of amplification of the reflected radiation without the additional costs of an additional amplifier, such as the third amplifier 56 in the optical circuit 40 (FIG. 4). Additionally, as noted above, with regard to some optical amplifiers, a 40 dB amplifier can be more than twice as expensive as a 20 dB amplifier. Thus, in embodiments where the amplifier 151 is a 20 dB amplifier, the optical circuit 40 benefits from 40 dB of gain (AG+RG, FIG. 3), with only the cost of a 20 dB amplifier, i.e., less than half the cost of a 40 dB amplifier.

Another aspect of at least one of the inventions disclosed herein includes the realization that some amplifiers, including bidirectional amplifiers, are formed in two stages and normally include an isolator between the two stages to minimize backward directed amplified signals. As such, the isolators normally stop light going backwards from the second stage back to the first stage of the amplifier. Thus, with reference to FIG. 8 (described below), in some embodiments, a circulator can be disposed between the first and second stages of a bidirectional amplifier, thereby reducing the cost of the bidirectional amplifier by eliminating the need for an isolator.

Figure 8:
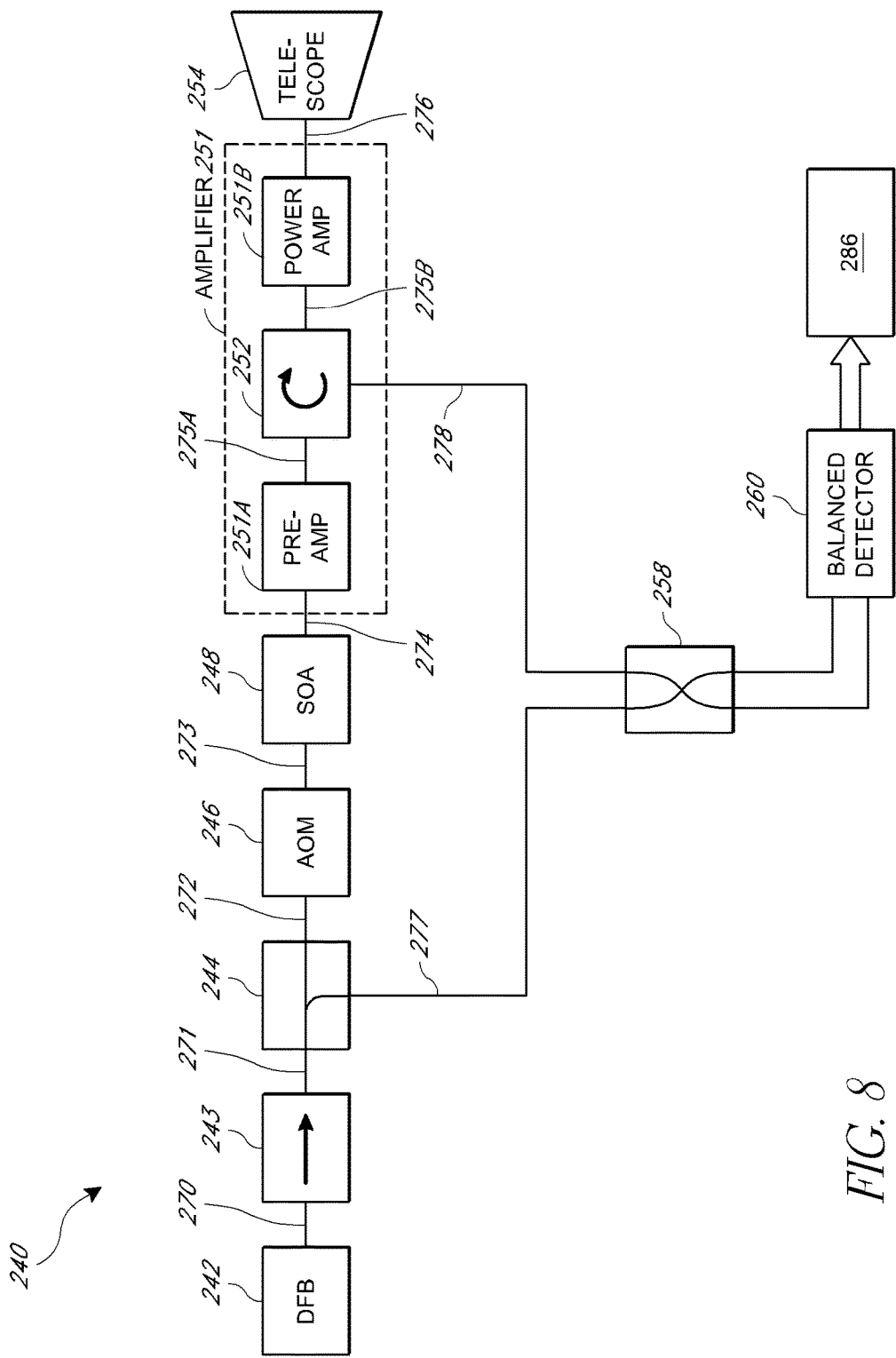
FIG. 8 is a schematic block diagram of another embodiment including a two stage amplifier.

FIG. 8 illustrates an embodiment of an optical circuit 240 which is a modification of the optical circuit 40. The components and features of the optical circuit 240 that are similar or the same as the optical circuits 40 and 140 are identified with reference numerals having the same 10s and 1s digits, except that 200 has been added thereto.

As shown in FIG. 8, the bidirectional amplifier 251 is in the form of a preamplifier 251A and a second stage amplifier 251B. Additionally, the circulator 252 is disposed between the preamplifier 251A and the second stage amplifier 251B.

In this configuration, amplified source light from the source 242 is provided to the upstream end of the preamplifier 251A by way of the optical fiber 274. Pre-amplified light is output from the preamplifier 251A to the circulator 252 by way of the optical fiber 275A. The pre-amplified light is then output from the circulator 252 into the upstream end of the second stage amplifier 251B by way of the optical fiber 275B. With the circulator 252 disposed between the preamplifier 251A and the second stage amplifier 251B, backward spontaneous emissions from the second stage amplifier 251B are prevented from flowing backwards into the preamplifier 251A.

The second stage amplifier 251B further amplifies the amplified light from the preamplifier 251A and the amplified light is then guided to the telescope by way of the optical fiber 276.

Reflected light is received by the telescope 254, and guided to the upstream end of the second stage amplifier 251B by way of the optical fiber 276. The second stage amplifier 251B, being a bidirectional amplifier, outputs amplified reflected light to the circulator by way of the optical fiber 275B. The circulator 252 outputs the reverse flowing amplified reflected light to the mixing device 258 by way of the optical fiber 278.

The optical circuit 240 described above achieves the benefit of additional amplification of reflected light received by the telescope 254, as described above with reference to FIG. 7. Additionally, the optical circuit 240 benefits from the cost reduction achievable by eliminating isolators normally disposed between two stage amplifiers, such as the amplifier 251 and replacing the isolator with the circulator 252. Additionally, the amplifier 251 can be formed with a single direction preamplifier 251A and a bidirectional amplifier used as the second stage amplifier 251B. Thus, both of the preamplifier 251A and second stage amplifier 251B do not have to be bidirectional.

Figure 9:
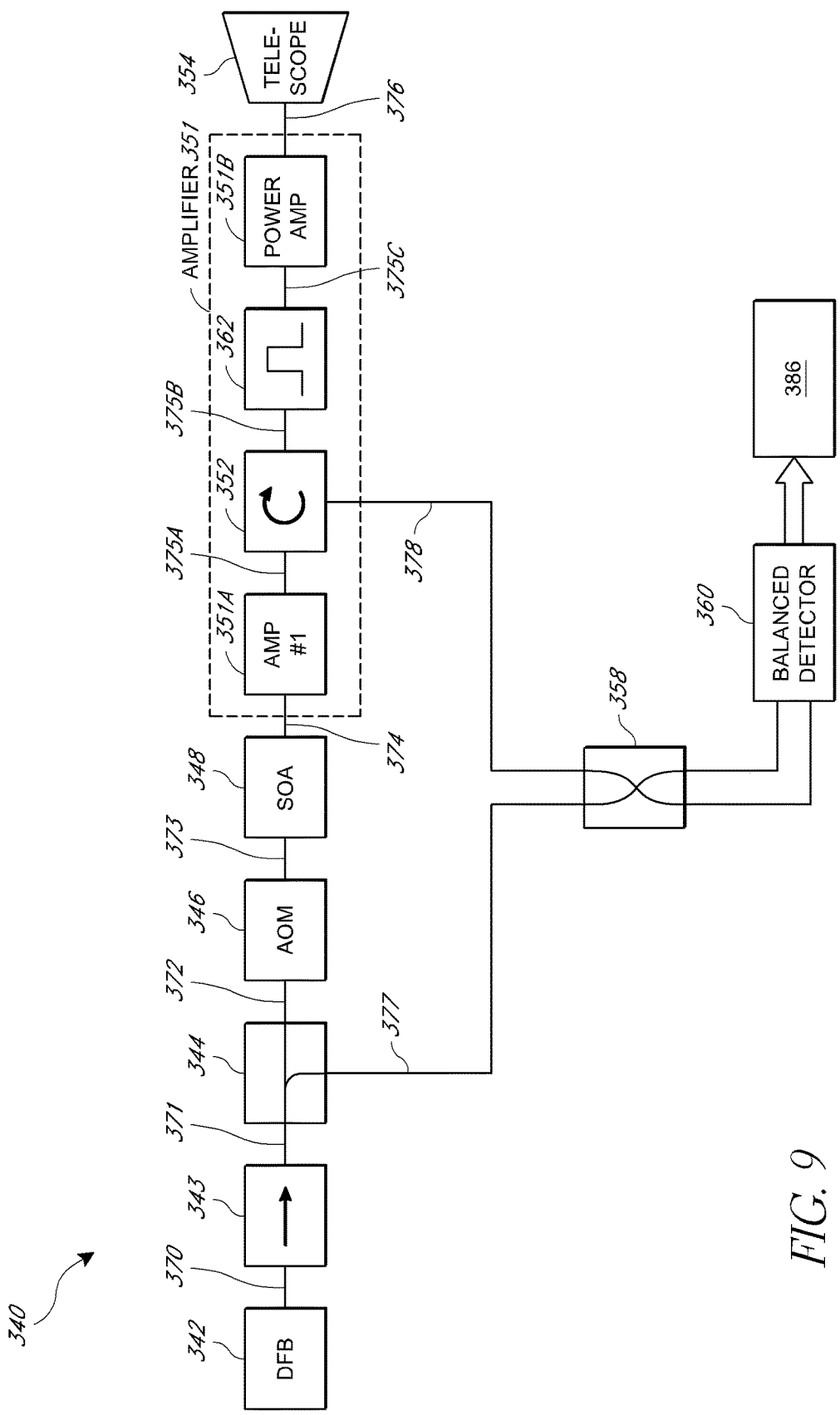
FIG. 9 is a schematic block diagram of another embodiment including a two stage amplifier and a pass filter.

FIG. 9 illustrates optical circuit 340 which is yet another modification of the optical circuit 40. Components and feature of the optical circuit 340 which are similar or the same as components or features of the optical circuits 40, 140, 240 are identified with reference numerals having the same 10s and 1s digits but 300 being added thereto.

In some embodiments, as illustrated in FIG. 9, the amplifier 351 can include a narrow pass filter 362. In the illustrated embodiment, the narrow pass filter 362 is disposed between the circulator 352 and the second stage amplifier 351B. The narrow pass filter 362 can have loss of approximately 1 dB and can be configured to filter out background blackbody radiation and spontaneous emission from the various amplifier stages, and allowing the desired frequencies to pass there through.

As such, background blackbody radiation scattering that may accompany light entering the telescope 354 along with the reflected light, can be filtered out of the amplified reflected light output at the upstream side of the second stage power amplifier 351B by way of the connection from the upstream side of the power amplifier 351B to the pass filter 362 by way of the optical fiber 375C. The filtered, amplified reflected light then output from the upstream side of the pass filter 362 is guided to the circulator 352 by way of the optical fiber 375B. The filtered, amplified reflected light is then guided to the mixer device 358 by way of the optical fiber 378. The bandpass filter 362 can also eliminate out-of-band spontaneous emission from power amplifier 351A, eliminating amplification of that power by power amplifier 351B. This associated power thus becomes available to amplify the desired, pulsed signal providing higher amplification of the output pulse as well as a more consistent pulse shape.

Figure 10:
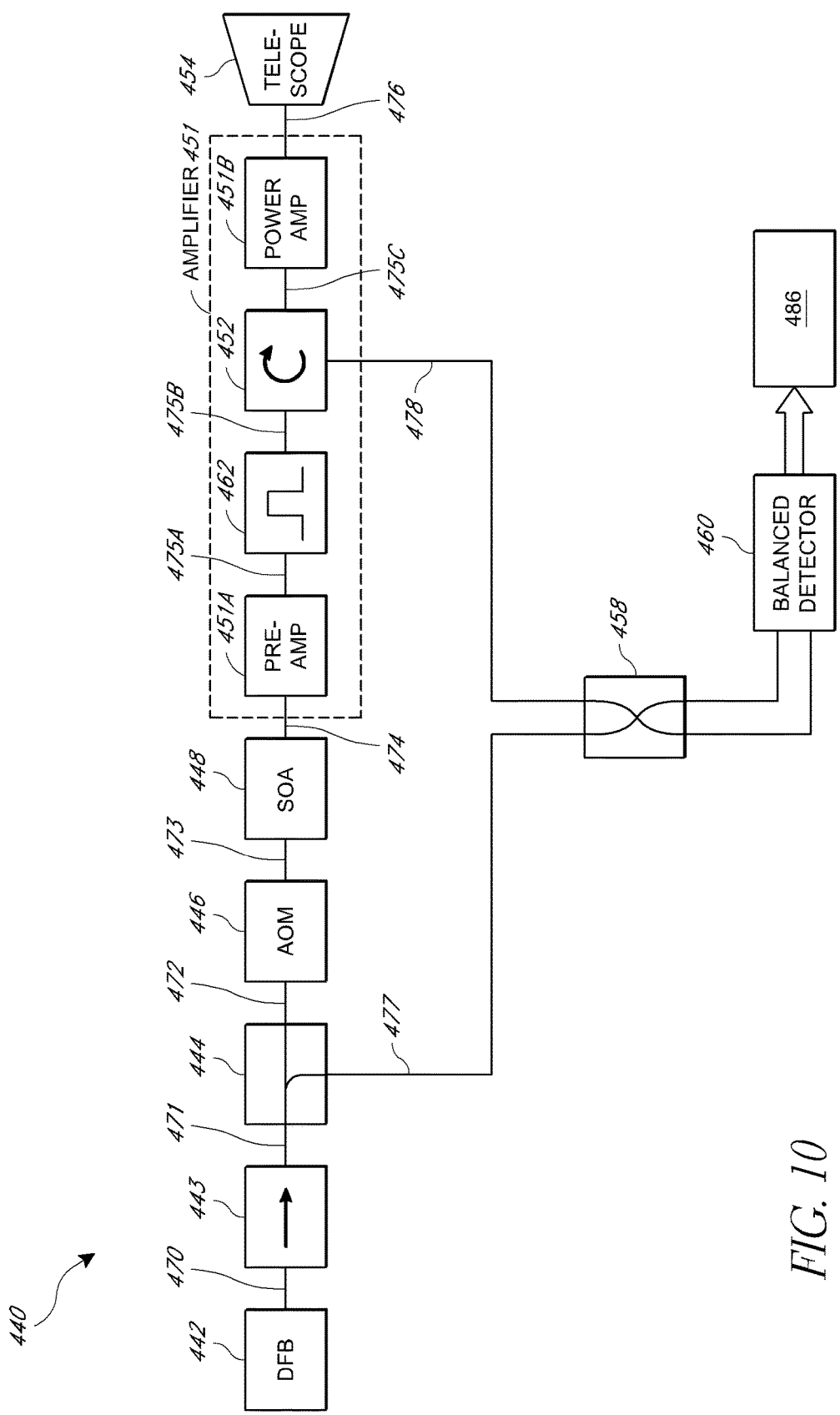
FIG. 10 is a schematic block diagram of yet another embodiment including a two stage amplifier and a bandpass filter.

FIG. 10 illustrates an optical circuit 440 which is yet another modification of the optical circuit 40. The features and components of the optical circuit 440 that are similar or the same as the optical circuits 40, 140, 240, 340 are identified with reference numerals having the 10s and 1s digits but 400 has been added thereto. The optical circuit 440 is essentially structurally the same as the optical circuit 340 except that the pass filter 462 is disposed between the preamplifier 451A and the circulator 452.

Figure 11:
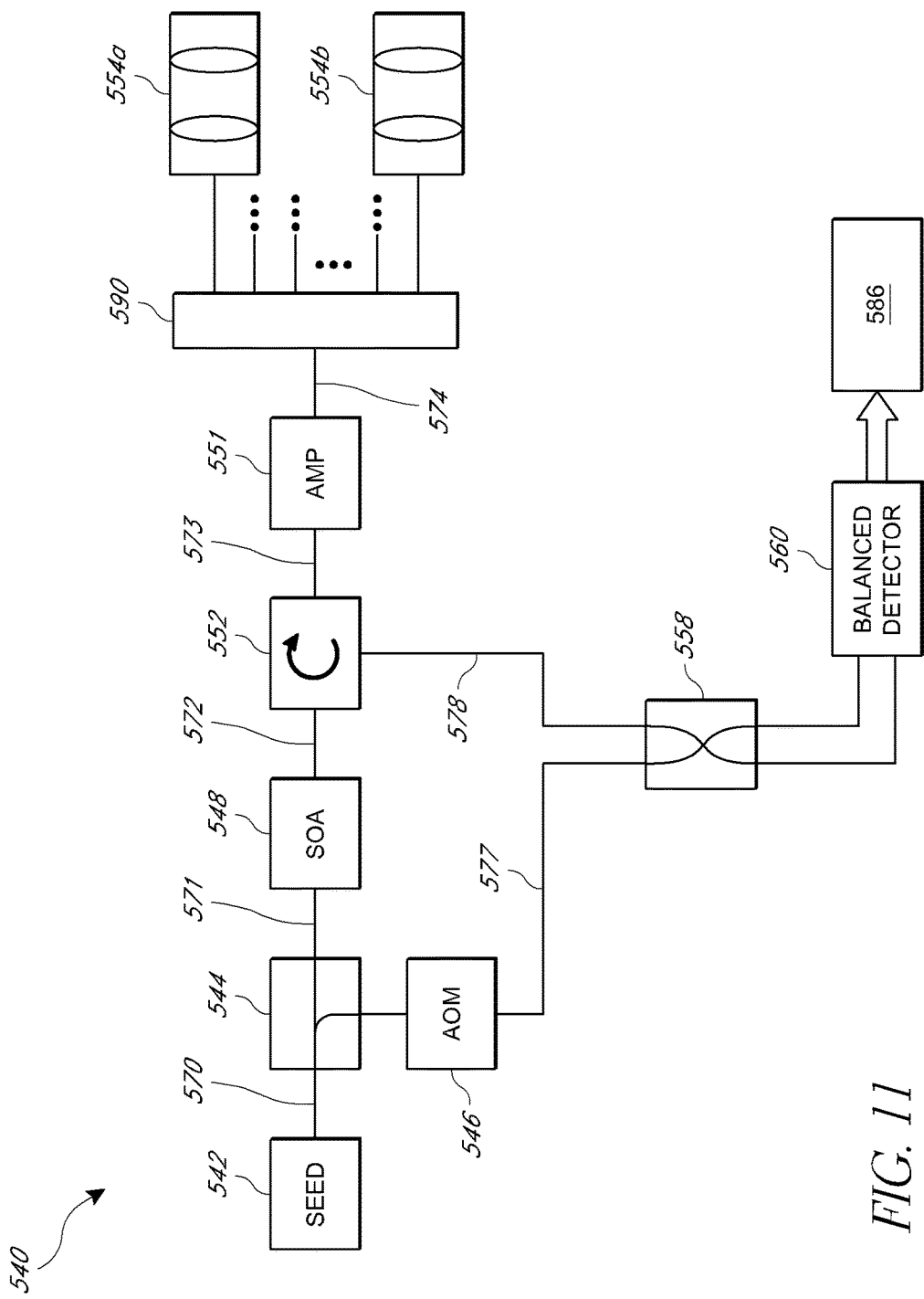
FIG. 11 is a schematic block diagram of yet another embodiment including a distribution device for multiplexing.

FIG. 11 illustrates an optical circuit 540 that is yet another modification of the optical circuit 40. Features and components of the optical circuit 540 are identified with reference numerals having the same 10s and 1s digits used to identify the components of the optical circuits 40, 140, 240, 340, 440, except that a 500 has been added thereto.

The optical circuit 540 can include a distribution device 590. The distribution device 590 can be configured to distribute the output from the amplifier 551 to a plurality of telescopes 554. In the illustrated embodiment of FIG. 11, there is an arbitrary number of telescopes, the uppermost one identified as telescope 554a and the lowermost telescope identified as telescope 554n. As such, the distribution device 590 is configured to distribute the output of the amplifier 551 to n telescopes 554.

In some embodiments, the distribution device 590 can be in the form of a 1×n passive splitter. In such an embodiment, the amplified source light from the amplifier 551 is simultaneously distributed to all telescopes 554a-554n. Additionally, reflected light is captured by all of the telescopes 554a, 554n and mixed and then guided to amplifier 551 such that the reflected light is further amplified prior to reaching the circulator 552.

An aspect of at least one of the inventions disclosed herein includes the realization that the circuit 540 can be further improved by incorporating an active switch for the distribution device 590. For example, the distribution device 590 can be, for example, but without limitation, a modern active optical switch. Such an active switch can be configured to direct light and to route light reflected from a particular telescope to the amplifier 551, thereby enabling the system incorporating the optical circuit 540 to analyze light from one of the plurality of telescopes at a time.

Further, the loss generated by such a modern active switch can be dramatically lower than a coupler splitter. For example, the Agiltron 4×1 bidirectional optical switch has a typical loss of only about 1.2 dB, approximately 6 dB better than a 1×4 passive coupler or splitter. As such, the optical circuit 540 benefits from the incorporation of a bidirectional amplifier 551, providing amplification of source radiation to the telescopes 554a-554n as well as amplification of the reflected light from the telescopes 554*a*, 554*n* prior to the reflected light being guided to the mixing device 558.

Additionally, because the distribution device 590 can be configured to connect selected ones of the telescopes 554*a*-55*n* with the amplifier 551, the circuit 540 can isolate signals generated by individual telescopes 554*a*-554*n* and thereby conduct discreet analysis on motion occurring at the target area defined by each of the different telescopes 554*a*-554*n* which may be configured to detect signals at different ranges and elevations relative to each other. Such discreet analysis of motion at different ranges and elevations can provide significant advantages when such circuits including the optical circuit 540 is used for mapping airflow approaching a wind turbine, such as those techniques described in U.S. Patent Publication No. US2012/0051907, U.S. Pat. No. 8,120,757 the entire contents of which is hereby expressly incorporated by reference.

Figure 12:
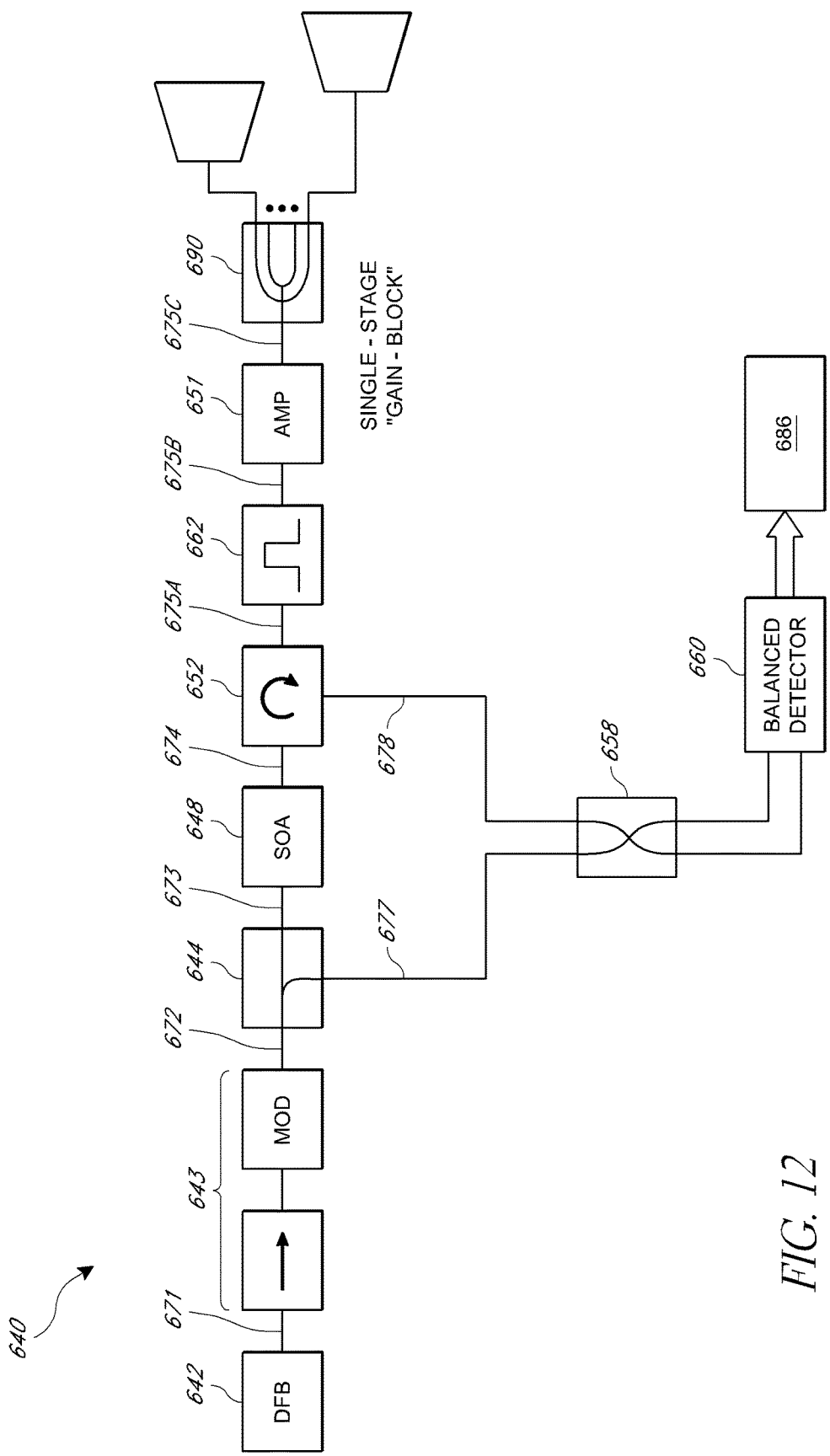
FIG. 12 is a schematic block diagram of yet another embodiment including a bidirectional splitter, bidirectional amplifier, and bidirectional bandpass filter.

FIG. 12 illustrates an optical circuit 640 which is yet another modification of the optical circuit 40. The features and components of the optical circuit 640 which are similar or the same as the optical circuit 40, 140, 240, 340, 440, or 540, are identified with the same reference numerals having the same 10s and 1s digits except that 600 has been added thereto.

As shown in FIG. 12, the optical circuit 640 includes a pass filter 662 disposed between the amplifier 651 and the circulator 652. Additionally, the optical circuit 640 includes a distribution device 690 which can be in the form of either a passive splitter or an active switch, as described above with reference to FIG. 11.

Additionally, the pass filter 662 can be optionally disposed between the first amplifier 648 and the circulator 652. Additionally, the amplifier 651 can be in the form of a two stage amplifier as described above with regard to optical circuit 240.

Figure 13:
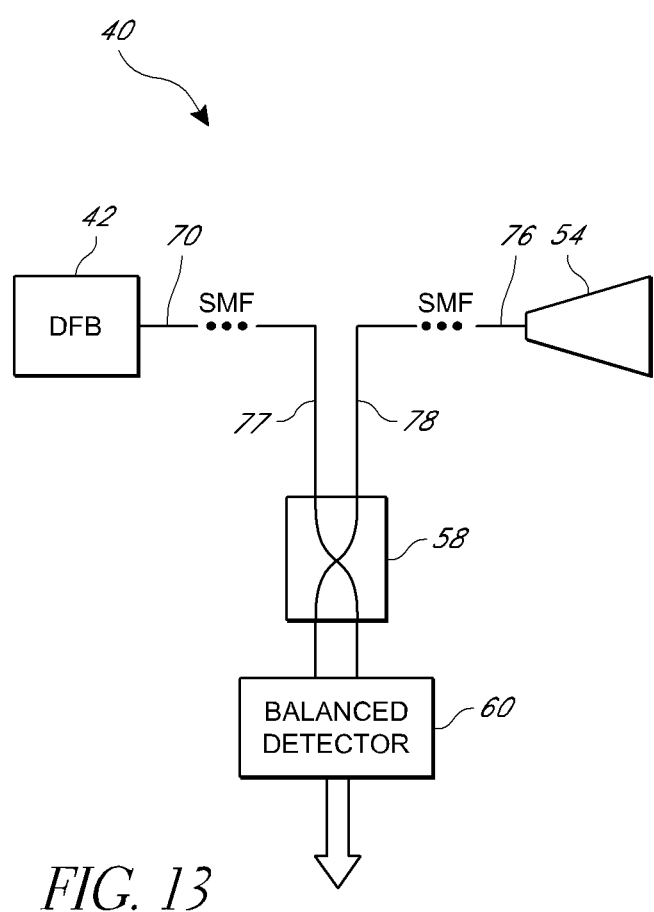
FIG. 13 is an enlarged schematic block diagram of a receive leg of an optical circuit that can be incorporated into any of the embodiments.

FIG. 13 illustrates a schematic representation of a portion of the optical circuit 40 for purposes of illustrating further options for components thereof. The description set forth below with regard to optical circuit 40 and the variations 40A, 40B, and 40C described below with reference to FIGS. 14-16 also apply equally to the optical circuits 140, 240, 340, 440, 540, 640, and 840 illustrated in FIG. 17.

With continued reference to FIG. 13, the optical circuit 14 can include components and optical fibers that are non-polarization maintaining components. In such an embodiment, the optical fibers can be made from single mode (SM) fibers. As such, the components of the optical circuit 40 can be less expensive thereby resulting in a lower cost for the optical circuit 40. However, such a configuration does result in reduced performance of an optical circuit, for example, causing undesirable dropouts of signal to the balance detector and inaccuracies in the ultimate output from the balance detector.

Figure 14:
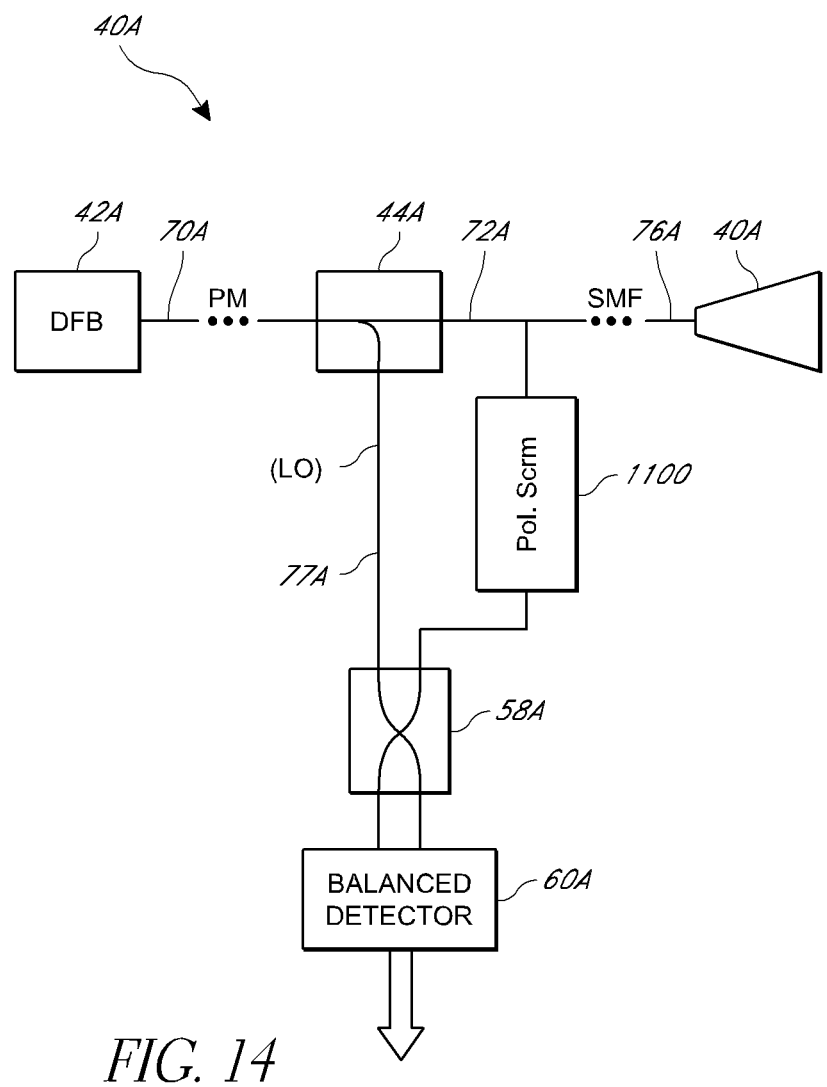
FIG. 14 is an enlarged schematic block diagram of a modification of the receive leg illustrated in FIG. 13 including a polarization scrambler.

FIG. 14 illustrates a modification of the portion of the optical circuit 40 illustrated in FIG. 13 and is identified generally by the reference numeral 40A. As shown in FIG. 14, part of the circuit 40A is formed with polarization maintaining (PM) devices, such as the optical fiber 70A and 77A and the remaining portion of the optical circuit 40A is made from non-polarization maintaining components, including single mode (SM) fiber versions of the optical fibers 72A and 76A. As such, the polarization of the radiation emitted from the radiation source 42A as well as that of the local oscillator portion of the circuit 40A including the optical fiber 77A is maintained, albeit, with higher cost components. However, the remaining portion of the optical circuit 40A is made from lower cost components. Thus, in order to benefit from the polarization maintaining nature of the local oscillator, the optical circuit 40A includes a polarization alignment device 1100. In the embodiment of FIG. 14, the polarization aligning device 1100 is in the form of a polarization scrambler. Polarization scramblers can result in a 3 dB loss and can cost approximately $2,000.00.

Figure 15:
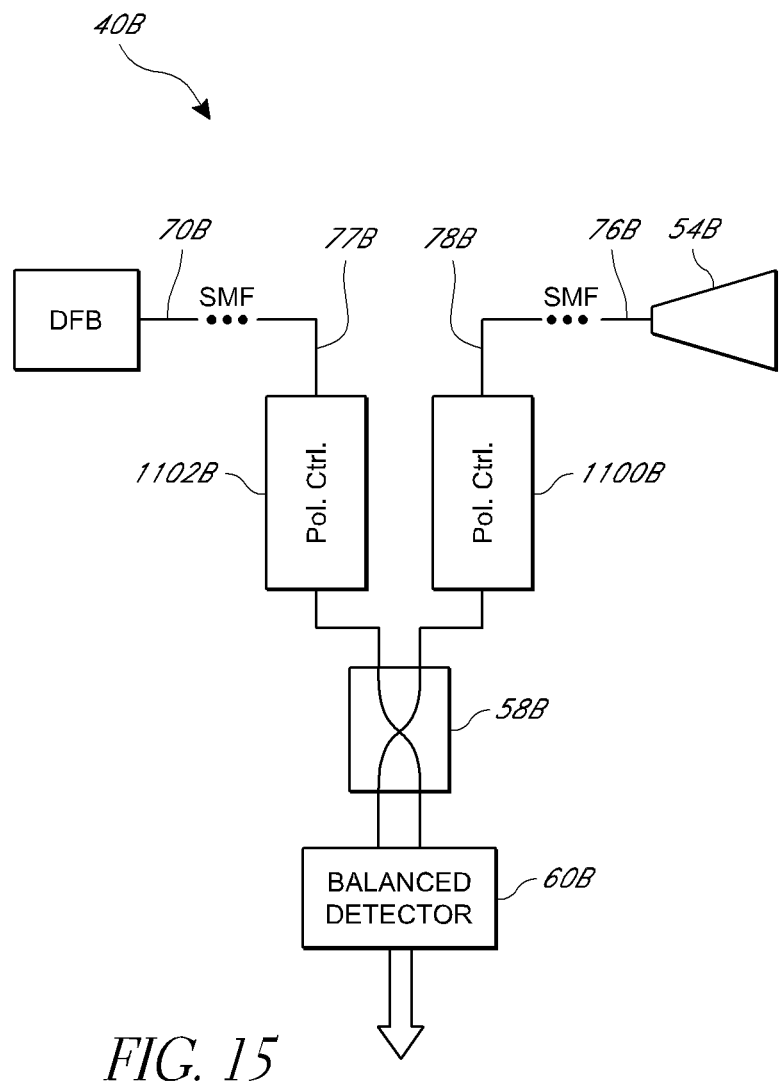
FIG. 15 is an enlarged schematic block diagram of another modification of the receive leg of FIG. 13 including a pair of polarization controllers.

FIG. 15 illustrates another variation of the portion of the optical circuit 40 illustrated in FIG. 13, and is referred to generally by the reference numeral 40B. As shown in FIG. 15, the optical circuit 40B is formed with non-polarization maintaining components including single mode (SM) fiber versions of the optical fibers 70B, 76B, 77B, and 78B. In order to provide the enhanced performance associated with aligned polarization, the optical circuit 40B includes first and second polarization alignment devices 1100*b*, 1102*b*. In the embodiment illustrated in FIG. 15, the polarization alignment devices are in the form of polarization controllers. In some embodiments the polarization controllers 1100*b*, 1102*b* can each include a splitter that splits an optical signal into its orthogonal, linearly polarized components, a rotator that rotates one of the components, and a combiner then recombines the components into an aligned polarized signal. Such polarization controller can generate an optical loss of 3-4 dB. However, the realignment of the polarization of the signals provided to the mixing device 58*b* helps greatly reduce dropouts associated with the optical circuit 40 illustrated in FIG. 13. Known polarization controllers can cost approximately $1,000.00. However, the additional cost of such polarization controllers can be offset by the reduced cost resulting from the use of non-polarization maintaining components in this optical circuit 40B, such as single mode fibers.

Figure 16:
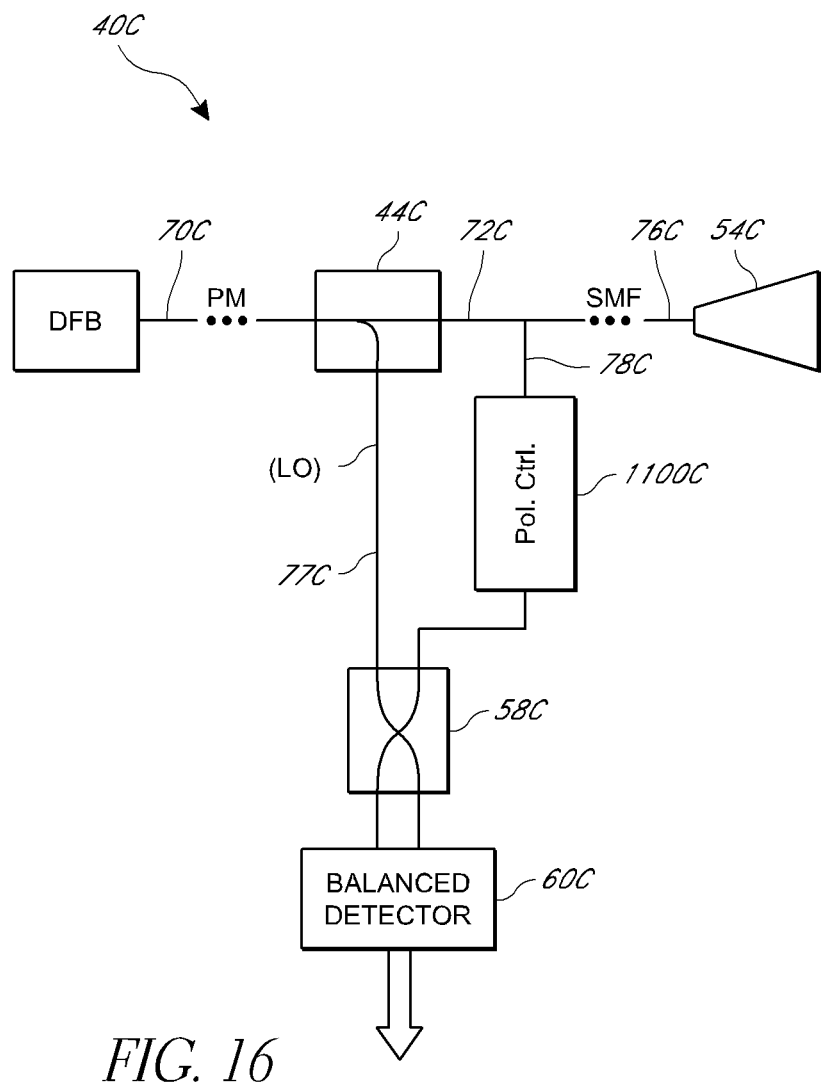
FIG. 16 is an enlarged schematic block diagram of another modification of the receive leg illustrated in FIG. 13 including a single polarization controller.

FIG. 16 illustrates yet another modification of the portion of the optical circuit 40 illustrated in FIG. 13, and is referred to generally by the reference numeral 40C. The components of the optical circuit 40C that are similar or the same to the components and features of the optical circuits 40, 40A, and 40B are identified with the same reference numeral except that a letter C has been added thereto.

As shown in FIG. 16, the optical circuit 40C includes polarization maintaining components, including optical fibers 70C and 77C. However, the remaining portion of the optical circuit 40C is connected with non-polarization maintaining components, including single mode fibers 72C, 76C, 78C, and other fibers not illustrated.

Thus, in order to benefit from the maintained polarization of the local oscillator provided by the optical fiber 77C, includes a single polarization alignment device 1100C. In the illustrated embodiment, the polarization alignment device 1100C can be in the form of a polarization controller, such as those described above with reference to FIG. 15. Thus, the optical circuit 40C of FIG. 16 can further result from lowered cost associated with using only a single polarization controller and the small additional cost of using only a limited amount of polarization maintaining components such as the optical fibers 70C and 77C.

Figure 17:
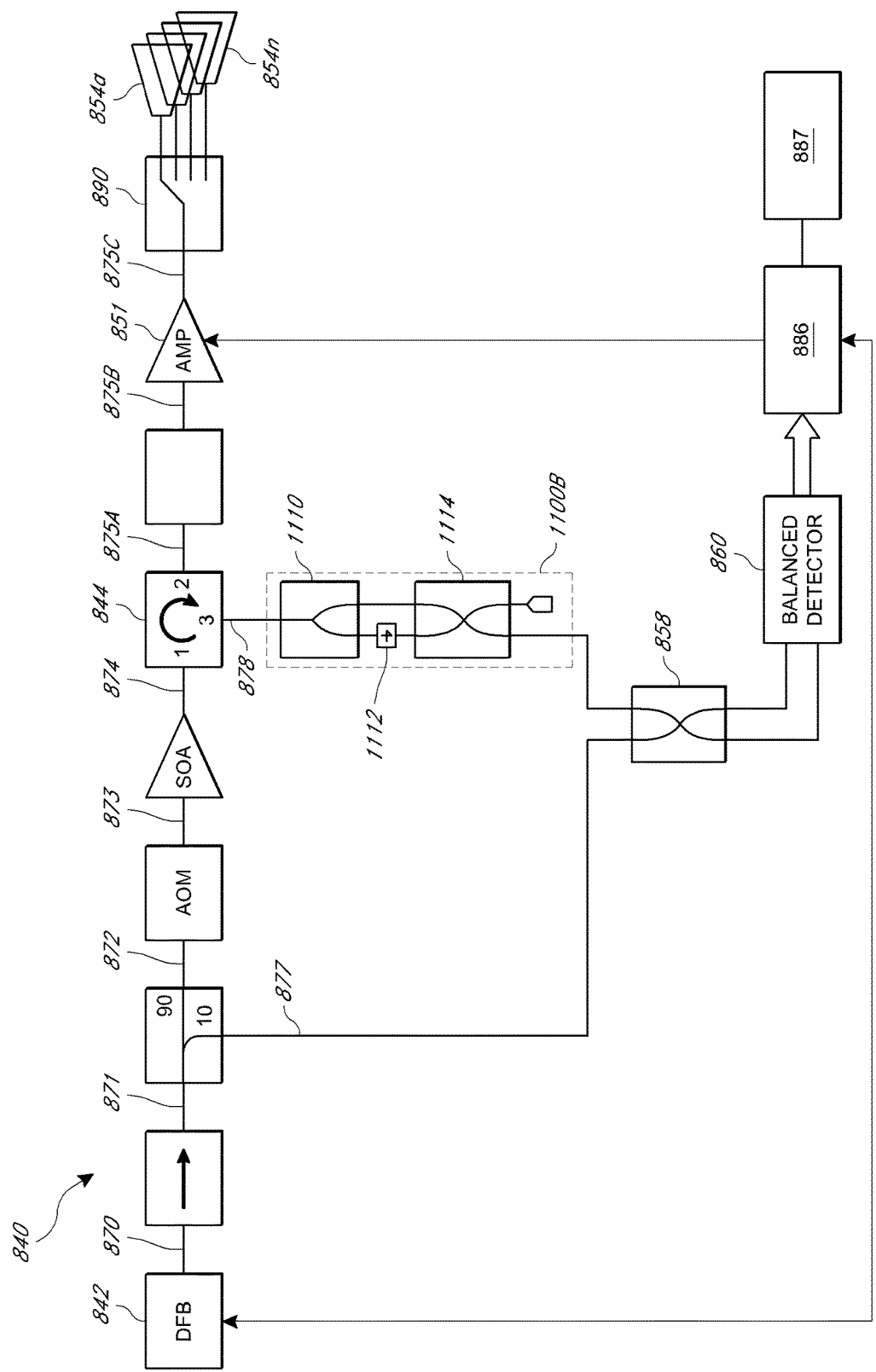
FIG. 17 is a schematic block diagram of yet another embodiment of an optical circuit including the polarization controller of FIG. 16.

FIG. 17 illustrates yet another modification of the optical circuit 40 illustrated in FIG. 4 and is referred to generally by the reference numeral 840. Features and components of the optical circuit 840 that are similar or the same as the optical circuits 40, 140, 240, 340, 440, 540, 640, and identified with the same reference numerals using the same 10s and 1s digits except that 800 has been added thereto.

As shown in FIG. 17, the optical circuit 840 includes a polarization controller 1100B from the embodiment of FIG. 15. As shown in FIG. 17, the polarization controller 1100B includes a splitter portion 1110, a rotation portion 1112 and a combining portion 1114. As such, the splitting portion 1110 is configured to split the incoming signal from the circulator 844 into orthogonal, linearly polarized components. The rotation portion 1112 rotates one of the components to be parallel with the other component. The combiner portion 1114 then recombines the two split signals into a single signal, for output to the mixing device 858.

As such, the optical circuit 840 can be connected with some non-polarization maintaining components, for example, including optical fibers 870, 871, and 877 with the remainder of the optical circuit 840 being connected with non-polarization maintaining components. For example, the optical fibers 872, 873, 874, 875*a*, 875*b*, 875*c*, and optical fiber 878.

Another aspect of at least one of the inventions disclosed herein includes the realization that internal reflections within the optical circuits described above can be used as calibration reference signals.

For example, with continued reference to FIG. 17, during an initial time period beginning when the source 842 outputs a pulse of radiation such as light, internal reflections are created by imperfections in the components in the optical circuit, including the optical fibers 870, 871, 872, 873, 874, 875A, 875B and telescopes 854*a-n*. Of these reflections, the reflections generated by or within components that are downstream of the circulator 844, e.g., fibers 875A, 875C and the telescopes 854*a-n*, are eventually received by the balance detector 860. All of these internal reflections are created by stationary objects, i.e., imperfections within the optical circuits. Thus, a controller, such as the controller 886 can be configured to utilize reflections as reference data. For example, a velocity calculation based on reflections generated at points downstream from the circulator 844 should be a zero velocity result.

Figure 18:
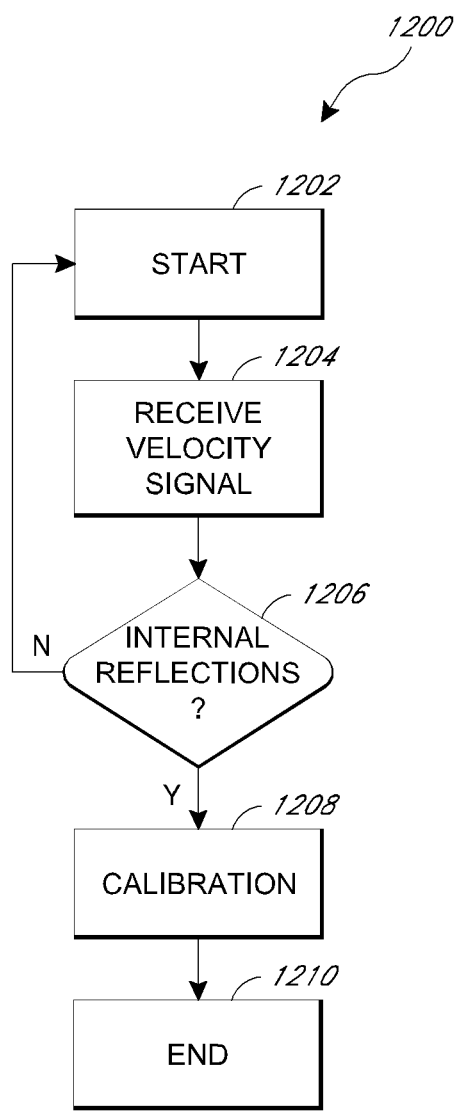
FIG. 18 is a flowchart illustrating an optional control routine that can be used for calibration purposes.
Figure 19:
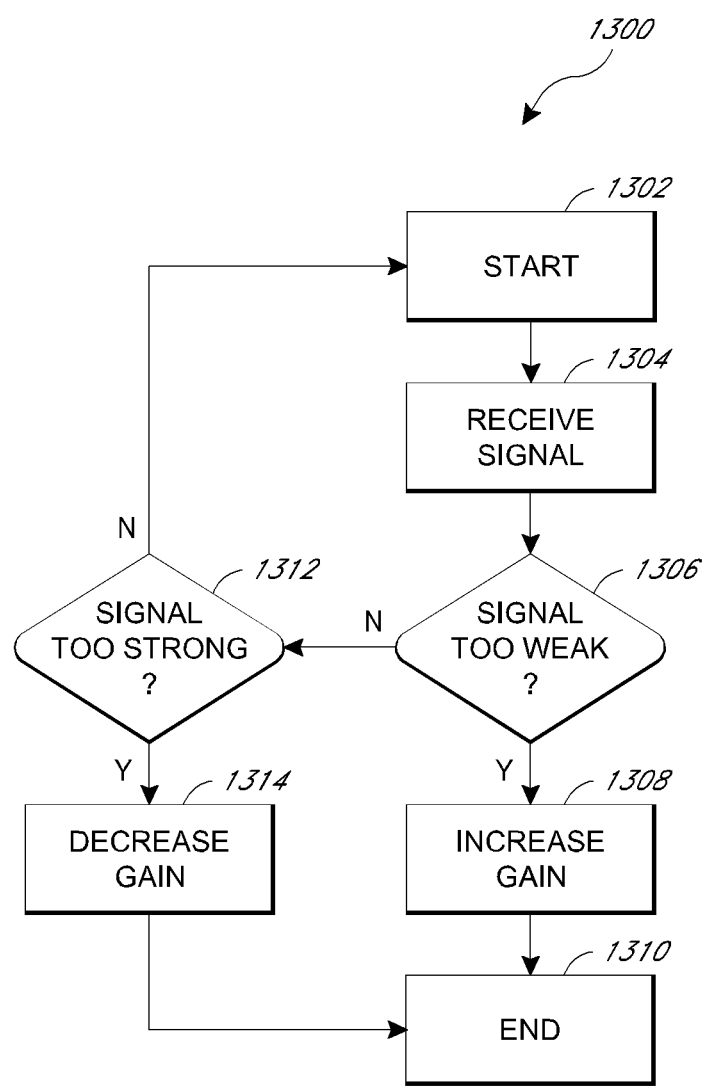
FIG. 19 is a flowchart illustrating an optional control routine for providing variable gain control of an optical circuit.

Thus, with reference to FIG. 18, the controller 886 can be configured to perform a calibration control routine 1200. In the control routine 1200, at the operation block 1202 the control routine 1200 can begin. For example, the control routine 1200 can begin when a pulse of energy is discharged from the source 842. After the operation block 1202, the control routine 1200 can move on to operation block 1204.

In the operation block 1204, the controller 886 can receive a signal from the balance detector indicative of a detected velocity, such as an electronic signal representing a frequency differential, described above. After the operation block 1204, the control routine 1200 can move on to decision block 1206. In the decision block 1206, it can be determined whether or not the signal received in the operation block 1204 is the result of internal reflections. For example, but without limitation, the controller 886 can be configured to determine whether or not the velocity signal corresponds to signals received by the balance detector 860 between the time the radiation source 842 issues radiation or light into the optical circuit 840 and before the time at which the last internal reflections would be received by the balance detector 860, such as the reflections generated in or at the telescopes 854*a-n*. Such a calculation can be based on a predetermined amount of time, based on the effective physical lengths of the optical circuit components and the speed of light in those components. For example, the speed of light in some commercially available optical fibers can be calculated to be about 200 m per microsecond, using well-known factors and constants. If it is determined that the signal received in operation block 1204 is not the result of internal reflections, the control routine 1200 can return to operation block 1202 and repeat. On the other hand, if it is determined in the decision block 1206 that the signal received in the operation block 1204 is a result of internal reflections, the control routine 1200 can move on to operation block 1208.

In the operation block 1208, the controller 886 can perform a calibration operation. For example, the calibration operation can include saving an indication that the data corresponding to the signal received in operation block 1204 corresponds to a velocity of zero. For example, such a calibration procedure could include applying an offset to any numerical velocity calculation that may have previously been performed on the output of the balance detector 860 which resulted in the signal received in operation block 1204. For example, if the previous velocity calculation was non-zero, the calibration operation can include applying an offset such that the numerical result is zero. The offset can then be saved and applied to future velocity calculations. After the operation block 1208, the control routine can move on to operation block 1210 and end. Optionally, the control routine 1200 can return to operation block 1202 after the operation block 1210.

Another aspect of at least one of the inventions disclosed herein includes the realization that the magnitude of signal return from reflections from the target region back into the telescopes 854 depend significantly on the type and quantity of particles at that time. For example, on a foggy day, the return signal can be very high, i.e., a large amount of the radiation output from the telescopes is reflected by the fog and back into the telescopes 854. On the other hand, on a very clear day for example in the mountains, return signals can be very weak due to for example, low humidity conditions with very low amounts of suspended particulates. Thus, a LIDAR system having amplifiers with larger, fixed gains sufficient to measure wind velocity for example at a range of 300 meters on a clear day with low amounts of particulates may be oversaturated on a foggy day when the reflections are much stronger, effectively blinding the instrument for example, oversaturating photo receptors within balance detectors 860.

An aspect of at least one of the inventions disclosed herein includes the realization that configuring an optical circuit to include variable gain can avoid oversaturating detection components such as the balance detectors 860.

Figure 20:
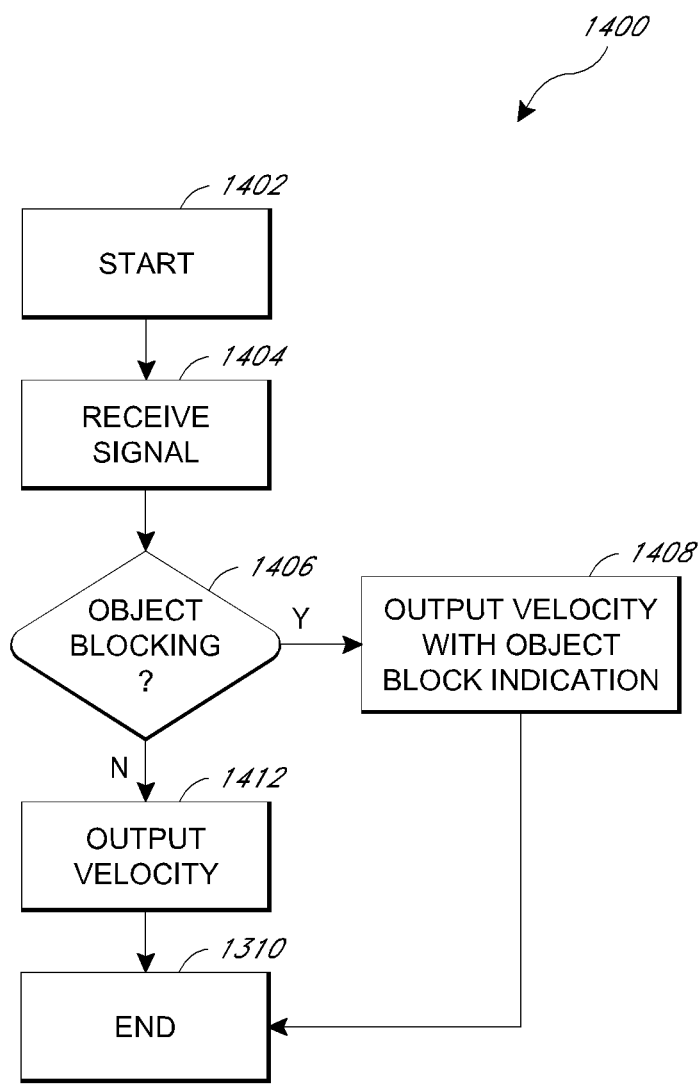
FIG. 20 is a flowchart illustrating a control routine that can be used for managing data associated with physical blocking of an LDV as illustrated in FIG. 21.

Thus, with reference to FIG. 20, the controller 886 can be configured to execute a control routine 1300. The control routine 1300 can begin at operation block 1302. For example, the operation block 1302 can begin when radiation is emitted from the radiation source 842. After the operation block 1302, the control routine 1300 can move on to operation block 1304.

In operation block 1304, the controller 886 can receive a signal from the balance detector 860 corresponding to reflections from a target area. After the operation block 1304, the control routine 1300 can move on to decision block 1306.

In the decision block 1306, it can be determined whether or not the signal received in the operation block 1304 is too weak. For example, the controller 886 can perform calculations to determine a signal to noise ratio or other figures indicative of whether or not reflected signals received in the operation 1304 are too weak. If it is determined in the decision block 1306 that the signals received in operation block 1304 are too weak, the routine 1300 can move on to operation block 1308.

In the operation block 1308, the gain of one or more amplifiers can be increased. For example, a controller 886 can be configured to increase the gain of amplifier 851 (FIG. 18). For example, the controller 886, and/or other control and power supply circuitry can be adjusted to increase the amount of current that can flow to amplifier 851 for amplification purposes. After the operation block 1308, the control routine 1300 can move on to operation block 1310 and end. Optionally, upon reaching the operation block 1310, the control routine 1300 can return to operation block 1302 and continue.

If it is determined, on the other hand, that the signal received in operation block 1304 was not too weak, the control routine 1300 can move on to decision block 1312.

In the decision block 1312, it can be determined if the signal received in the operation block 1304 was too strong. For example, as noted above with the decision block 1306, the controller 886 can be configured to determine signal to noise ratios or other factors indicative of whether or not the signal received in operation block 1304 was too strong. If it is determined in the decision block 1312 that the signal received in operation block 1304 is too strong, the control routine 1300 can move on to operation block 1314.

In operation block 1314, gain of one or more amplifiers can be decreased. For example, similarly to that described above with reference to operation block 1308, the gain of amplifier 851 can be decreased. For example, the controller 886, or other control and power supply circuitry can be adjusted to limit or lower the amount of current available to the amplifier 851 for amplification purposes. The amount of decrease of gain in operation block 1314 and the amount of increase of gain in operation block 1308 can be made in a stepwise fashion, each increase or decrease of gain being made in predetermined increments, or other techniques can also be used. After the operation block 1314, the routine 1300 can move on to operation block 1310.

In the decision block 1312, if it is determined that the signal received in operation block 1304 was not too strong, the control routine can return to operation block 1302 and repeat.

Thus, during operation of control routine 1300, the gain of one or more amplifiers can be incrementally increased each time it is determined that a signal is too weak. Similarly, the control routine can in a stepwise manner, decrease the gain of one or more amplifiers in the optical circuit 840 when it is determined that a signal is too strong. On the other hand, if it is determined that a signal is not too strong or not too weak, then the control routine can skip any steps of increasing or decreasing gain and allow the optical circuit 840 to continue operation.

As noted above, another aspect of at least one of the inventions disclosed herein includes the realization that velocity data captured during times when wind turbine blades, for example, are blocking light emitted through the telescopes 854, which would be a zero velocity, can ultimately cause problems in further processing or using the resulting velocity data, and thereby can be considered as corrupted velocity data. Thus, an aspect of at least one of the inventions disclosed herein includes the realization that providing for identification and/or blocking of invalid velocity data can be beneficial to downstream users of velocity data provided or collected or generated by the controller 886.

For example, with reference to FIG. 22, the controller 886 can be configured to execute a control routine 1400. The control routine 1400 can start with an operation block 1402, for example, when the radiation source 842 emits radiation into the optical circuit 840. After the operation block 1402, the control routine 1400 can move on to operation block 1404.

In the operation block 1404, a signal indicative of a velocity can be received. After the operation block 1404, the control routine 1400 can move on to decision block 1406.

In the decision block 1406, it can be determined whether or not an object is blocking the radiation emitted from the telescopes 854. For example, the controller 886 can be connected with a device configured to detect if an object is physically in front of the telescopes 854. In some embodiments, the device 887 can be in the form of a physical switch, an optical sensing device, a range sensing device, or another device. In some embodiments, the device 887 may be a very early return signal as detected by the optical system. A strong, signal soon after the pulse exits the telescope is indicative of a reflection off of a turbine blade. Optionally, the device 887 can be in the form of a digital camera with at least a one hertz frame rate. Optionally, the device 887 can be a rotational sensor having a predetermined registration with a shaft upon which turbine blades are mounted thus enabling the controller 886 to calculate, by detecting rotation of the turbine shaft, when the blades are in front of the telescopes 854. Other devices can also be used. If, in the decision block 1406, it is determined that an object is blocking the telescopes 854, the control routine 1400 can move on to operation block 1408.

In the operation block 1408, velocity data corresponding to the signal received in operation block 1404 can be deleted, or it can be saved along with an indication that it relates to a detection during which an object was blocking the telescopes 854. For example, the controller 886 can be configured to create a sequential recording of velocity calculations. The velocity calculations could be in the form of a single or multi-column table of data including data indicative of detected velocities and one or more other columns relating to other characteristics associated with the recordings. For example, a second column can be reserved for data or indicia indicating whether or not the telescopes were blocked. After the operation block 1408 the routine 1400 can move on to operation block 1410 and end. Optionally, the routine 1400 can, after operation block 1410, return to operation block 1402 and repeat.

In the decision block 1406, if it is determined that an object is not blocking the telescopes 854, the control routine 1400 can move on to operation block 1412.

In the operation block 1412, the velocity data corresponding to the signal received in operation block 1404 can be saved as accurate, normal, or non-corrupted velocity data. For example, as noted above, the controller 886 can be configured to store velocity data corresponding to signals received from the balance detector 860. Thus, when it is determined that the telescopes are not blocked by an object, the controller 886 can store a corresponding velocity calculation without an indication that the telescopes 854 were blocked at that time. This can also be referred to as "normal" velocity data or "non-corrupted" velocity data.

Although a feature may appear to be described in connection with a particular embodiment, one skilled in the art would recognize that various features of the described embodiments can be combined.

What is claimed is:

1. A laser Doppler velocimeter comprising:
   a source of radiation;
   at least a first bidirectional optical amplifier;
   a transceiver;
   a photodetector;
   an optical waveguide circuit coupling light from the radiation source, the first bidirectional optical amplifier, the transceiver, and the photodetector, the optical waveguide circuit comprising a first optical waveguide coupling light from the radiation source to an upstream side of the first bidirectional amplifier, a second optical waveguide coupling light from a downstream side of the first bidirectional amplifier with an upstream side of the transceiver, and a third optical waveguide connecting the upstream side of the first bidirectional amplifier with the photodetector.

2. The laser Doppler velocimeter according to claim 1 additionally comprising an optical circulator, the optical circulator configured to guide light from the radiation source to the first bidirectional amplifier, and to guide reflected light input into the downstream end of the first bidirectional amplifier and output from the upstream side of the first bidirectional amplifier, to the photodetector.

3. The laser Doppler velocimeter according to claim 2 additionally comprising a bandpass filter, the first optical waveguide connecting the bandpass filter between the optical circulator and the first bidirectional amplifier.

4. The laser Doppler velocimeter according to claim 1, wherein the radiation source comprises first and second outputs, the first output of the radiation source being connected to the first optical waveguide, the second output of the radiation source being connected to the reflected light output with a third optical waveguide.

5. The laser Doppler velocimeter according to claim 4, wherein the radiation source comprises a laser having a laser output and splitter having a splitter input connected to the laser output, the splitter comprising the first and second outputs of the radiation source.

6. The laser Doppler velocimeter according to claim 1, wherein the first bidirectional amplifier comprises a single direction optical preamplifier, an optical circulator, and a bidirectional optical power amplifier, the first waveguide connecting, in series, the upstream side of the first bidirectional amplifier to the single direction optical preamplifier, then to the optical circulator, and then to the bidirectional optical power amplifier, and then the downstream side of the first bidirectional amplifier, the second optical waveguide extending from the optical circulator and to the photodetector without passing through the single direction optical preamplifier.

7. A laser Doppler velocimeter comprising:
a source of radiation;
at least a first bidirectional optical amplifier;
a transceiver;
a photodetector;
an optical waveguide circuit coupling light from the radiation source, the first bidirectional optical amplifier, the transceiver, and the photodetector, the optical waveguide circuit comprising a first optical waveguide coupling light from the radiation source to an upstream side of the first bidirectional amplifier, a second optical waveguide coupling light from a downstream side of the first bidirectional amplifier with an upstream side of the transceiver, and a third optical waveguide connecting the upstream side of the first bidirectional amplifier with the photodetector;
an optical circulator, the optical circulator configured to guide light from the radiation source to the first bidirectional amplifier, and to guide reflected light input into the downstream end of the first bidirectional amplifier and output from the upstream side of the first bidirectional amplifier, to the photodetector; and
a second amplifier, the first optical waveguide connecting the second optical amplifier between the radiation source and the optical circulator.

8. The laser Doppler velocimeter according to claim 7 additionally comprising a third optical waveguide connecting an output of the radiation source with the photodetector.

9. The laser Doppler velocimeter according to claim 8, additionally comprising an optical mixer having an input and an output, the third optical waveguide connecting the output of the radiation source with the input of the optical mixer, the second optical waveguide connecting the upstream side of the first bidirectional amplifier with the input of the optical mixer.

10. The laser Doppler velocimeter according to claim 8, wherein the optical mixer comprises a 2×2 optical coupler.

11. A laser Doppler velocimeter, comprising:
a source of radiation;
at least a first bidirectional optical amplifier;
a transceiver;
a signal processor; and
an optical waveguide comprising:
a first waveguide extending between the source of radiation and the transceiver and configured to guide radiation from the source of radiation, through the first bidirectional amplifier in a first direction and to the transceiver,
a second optical waveguide extending between the transceiver and the signal processor and configured to guide reflected light received by the transceiver, through the first bidirectional amplifier in a second direction opposite the first direction, and to the signal processor.

12. The laser Doppler velocimeter according to claim 11 additionally comprising an optical circulator disposed in the first optical waveguide between the radiation source and the first bidirectional amplifier, the optical circulator configured to guide light from the radiation source to the first bidirectional amplifier, and to guide amplified reflected light from the first bidirectional amplifier to the signal processor.

13. The laser Doppler velocimeter according to claim 12 additionally comprising a bandpass filter, the first optical waveguide connecting the bandpass filter between the optical circulator and the first bidirectional amplifier.

14. The laser Doppler velocimeter according to claim 11 additionally comprising a third optical waveguide connecting the radiation source with the signal processor and configured to guide radiation from the radiation source to the signal processor without passing through the transceiver.

15. The laser Doppler velocimeter according to claim 11 additionally comprising a plurality of transceivers and an optical splitter disposed in the first and second optical waveguides, between the plurality of transceivers and the first bidirectional amplifier.

16. The laser Doppler velocimeter according to claim 11 additionally comprising a plurality of transceivers and an active optical switch having an input and a plurality of outputs connected to the plurality of transceivers and disposed in the first and second optical waveguides, between the plurality of transceivers and the first bidirectional amplifier.

17. The laser Doppler velocimeter according to claim 11 additionally comprising a controller configured to adjust a gain of the bidirectional amplifier.

18. The laser Doppler velocimeter according to claim 11 additionally comprising at least a first polarization alignment device, wherein at least a portion of the optical waveguide comprises non-polarization maintaining optical fibers.

19. A laser Doppler velocimeter, comprising:
a source of radiation;
at least a first bidirectional optical amplifier;

a transceiver;
a signal processor; and
an optical waveguide comprising:
- a first waveguide extending between the source of radiation and the transceiver and configured to guide radiation from the source of radiation, through the first bidirectional amplifier in a first direction and to the transceiver,
- a second optical waveguide extending between the transceiver and the signal processor and configured to guide reflected light received by the transceiver, through the first bidirectional amplifier in a second direction opposite the first direction, and to the signal processor;
- an optical circulator disposed in the first optical waveguide between the radiation source and the first bidirectional amplifier, the optical circulator configured to guide light from the radiation source to the first bidirectional amplifier, and to guide amplified reflected light from the first bidirectional amplifier to the signal processor; and
- a second amplifier, the first optical waveguide connecting the second optical amplifier between the radiation source and the optical circulator.

20. The laser Doppler velocimeter according to claim 19, wherein the second amplifier comprises a pre-amplifier, the preamplifier and the first bidirectional amplifier defining a two-stage optical amplifier.

21. A laser Doppler velocimeter, comprising:
a source of radiation;
a transceiver;
a first variable gain optical amplifier;
an optical waveguide comprising:
- a first waveguide extending between the source of radiation and the transceiver and configured to guide radiation from the source of radiation, through the variable gain optical amplifier in a first direction and to the transceiver,
- a second optical waveguide extending between the transceiver and the signal processor and configured to guide reflected light received by the transceiver, in a second direction opposite the first direction, and to the signal processor.

22. The laser Doppler velocimeter according to claim 21 additionally comprising a controller connected to the first variable gain optical amplifier, the controller configured to adjust a gain of the first variable gain optical amplifier.

23. The laser Doppler velocimeter according to claim 22 additionally comprising a power source connected to the variable gain amplifier so as to supply the variable gain amplifier with electrical power for amplifying the radiation from the radiation source, wherein the controller is configured to limit electrical power available to the variable gain amplifier.

24. The laser Doppler velocimeter according to claim 23, wherein the controller is configured to raise and lower the amount of electrical energy available to the variable gain amplifier so as to change the gain of the variable gain amplifier.

25. The laser Doppler velocimeter according to claim 22, wherein the controller is configured to determine if the gain of the variable gain amplifier is too weak and if the gain of the variable gain amplifier is too strong, to reduce the gain of the variable gain amplifier if the gain of the variable gain amplifier is too strong, and to increase the gain of the variable gain amplifier if the gain of the variable gain amplifier is too weak.

26. A laser Doppler velocimeter, comprising:
a source of radiation;
at least a first optical amplifier;
a transceiver;
at least a first polarization alignment device;
a signal processor; and
an optical waveguide comprising:
- a first waveguide extending between the source of radiation and the transceiver and configured to guide radiation from the source of radiation, through the first optical amplifier in a first direction and to the transceiver,
- a second optical waveguide extending between the transceiver and the signal processor and configured to guide reflected light received by the transceiver, in a second direction opposite the first direction, then through the first polarization alignment device and to the signal processor;
wherein at least a portion of the optical waveguide comprises non-polarization maintaining optical fibers.

27. The laser Doppler velocimeter according to claim 26 wherein the polarization alignment device comprises a splitter portion configured to split the reflected light into orthogonal, first and second linearly polarized components, a rotator configured to rotate the first linearly polarized component, and a combiner configured to recombines the first and second linearly polarized components into an aligned, polarized signal.

28. The laser Doppler velocimeter according to claim 26 wherein the optical waveguide further comprises a third waveguide configured to guide light from the source to the signal processor without passing through the first optical amplifier, the third waveguide comprising polarization maintaining optical fibers.

29. The laser Doppler velocimeter according to claim 28, wherein the third waveguide does not include the first polarization alignment device.

30. The laser Doppler velocimeter according to claim 28, wherein the first waveguide comprises an upstream portion, a splitter, and a downstream portion, the upstream portion connecting the source with the splitter and the downstream portion connecting the splitter with the transceiver, wherein the third waveguide comprises the upstream portion, and wherein the downstream portion comprises a plurality of optical fibers, wherein substantially all of the plurality of optical fibers are non-polarization maintaining fibers.

* * * * *